US012629784B2

(12) United States Patent
Cola et al.

(10) Patent No.: US 12,629,784 B2
(45) Date of Patent: May 19, 2026

(54) SOLDER-CARBON NANOSTRUCTURE COMPOSITES AND METHODS OF MAKING AND USING THEREOF

(71) Applicant: Carbice Corporation, Atlanta, GA (US)

(72) Inventors: Baratunde Cola, Atlanta, GA (US); Craig Green, Atlanta, GA (US); A. Davin Oetomo, Atlanta, GA (US)

(73) Assignee: Carbice Corporation, Atlanta, GA (US)

( * ) Notice: Subject to any disclaimer, the term of this patent is extended or adjusted under 35 U.S.C. 154(b) by 467 days.

(21) Appl. No.: 17/551,937

(22) Filed: Dec. 15, 2021

(65) Prior Publication Data

US 2022/0184748 A1     Jun. 16, 2022

Related U.S. Application Data

(60) Provisional application No. 63/126,432, filed on Dec. 16, 2020.

(51) Int. Cl.
| | |
|---|---|
| *B32B 9/00* | (2006.01) |
| *B22D 19/00* | (2006.01) |
| *B23K 35/24* | (2006.01) |
| *C01B 32/174* | (2017.01) |

(52) U.S. Cl.
CPC .............. *B23K 35/24* (2013.01); *B22D 19/00* (2013.01); *C01B 32/174* (2017.08); *C01B 2202/08* (2013.01); *C01B 2202/22* (2013.01); *C01B 2202/24* (2013.01); *C01B 2202/34* (2013.01)

(58) Field of Classification Search
CPC ....... Y10T 418/30; B82Y 30/00; B82Y 40/00; C01B 2202/22; C01B 2202/24; C01B 2202/34; C01B 2202/08; C01B 32/174; B23K 35/24
USPC ......................................................... 428/408
See application file for complete search history.

(56) References Cited

U.S. PATENT DOCUMENTS

| | | | |
|---|---|---|---|
| 7,803,262 B2 | 9/2010 | Haik | |
| 2003/0044608 A1 | 3/2003 | Yoshizawa | |
| 2005/0116336 A1 | 6/2005 | Chopra | |
| 2005/0139642 A1* | 6/2005 | Koning ................. | B82Y 10/00 228/248.1 |
| 2006/0062985 A1 | 3/2006 | Karandikar | |
| 2006/0228288 A1 | 10/2006 | Chow | |

(Continued)

FOREIGN PATENT DOCUMENTS

| | | |
|---|---|---|
| CN | 103586464 | 2/2014 |
| EP | 1923476 | 5/2008 |

(Continued)

OTHER PUBLICATIONS

Bakshi, et al., "Carbon nanotube reinforced metal matrix composites—a review", Intl. Materials Reviews, 55(1):41-64 (2010).

(Continued)

*Primary Examiner* — Daniel H Miller
(74) *Attorney, Agent, or Firm* — PABST PATENT GROUP LLP

(57) ABSTRACT

Solder-carbon nanostructure composites and methods of making and using thereof are described. Such composites can be useful for thermal application and can serve, for example, as thermal interface materials (TIMs).

33 Claims, 2 Drawing Sheets

(56) References Cited

U.S. PATENT DOCUMENTS

| | | |
|---|---|---|
| 2008/0179104 A1 | 7/2008 | Zhang |
| 2011/0311427 A1 | 12/2011 | Hauge |
| 2013/0053471 A1 | 2/2013 | Studart |
| 2014/0212640 A1 | 7/2014 | Piazza |
| 2014/0227477 A1* | 8/2014 | Cola ..................... C25D 7/006 |
| | | 427/372.2 |
| 2015/0367617 A1 | 12/2015 | Balachandra |

FOREIGN PATENT DOCUMENTS

| | | |
|---|---|---|
| JP | 2011057466 A | 3/2011 |
| JP | 2011238789 A | 11/2011 |
| KR | 1020130108890 | 2/2014 |
| TW | 201834960 A | 10/2018 |
| WO | 2014182645 | 11/2014 |

OTHER PUBLICATIONS

Daoush, et al., "Electrical and mechanical properties of carbon nanotube reinforced copper nanocomposites fabricated by electroless deposition process", Materials Science and Engineering A, 513-514: 247-253 (2009).

International Search Report for corresponding PCT application PCT/US2015/040000 mailed Oct. 15, 2015.

Koppad, et al., "On shear-lag and thermal mismatch model in multiwalled carbon nanotube/copper matrix nanocomposites", Journal of Alloys and Compounds, 549: 82-87 (2012).

Maqbool, et al., "Mechanical characterization of copper coated carbon nanotube reinforced aluminum matrix composites", Materials Characterization, 86: 39-48 (2013).

International Search Report PCT/US2021/063507 mailed Mar. 21, 2022.

* cited by examiner

SOLDER-CARBON NANOSTRUCTURE COMPOSITES AND METHODS OF MAKING AND USING THEREOF

CROSS-REFERENCE TO RELATED APPLICATIONS

This application claims the benefit of and priority to U.S. Provisional Application No. 63/126,432 filed Dec. 16, 2020, which is hereby incorporated herein by reference in its entirety.

FIELD OF THE INVENTION

This invention is in the field of carbon nanostructure containing solder composites and methods of making and using thereof.

BACKGROUND OF THE INVENTION

In order to dissipate extreme heat fluxes expected in next generation SiC devices, total package resistances of less than 0.1 $cm^2$-K/W are needed. One must, however, contend with the thermal resistance of the materials found in such SiC packages where the materials account for nearly 80% of the 0.1 $cm^2$-K/W goal. For example, solder and interfaces thereof account for at least 30% of the resistance number.

Thus, there is a need for addressing issues of brittleness and reliability of traditional solder and the interfaces formed therefrom, while at the same time maintaining metal-like thermal resistances.

Thus, there exists a need for providing improved solder-based composites and methods of manufacturing thereof.

Therefore, it is an object of the invention to provide solder-based composites.

It is a further object of the invention to preserve/retain the electrical, thermal, and mechanical properties of solder-based composites.

It is a further object of the invention to provide facile and scalable methods of producing such solder-carbon nanotube composites.

It is still a further object of the invention to provide methods of using such solder-carbon nanotube composites.

SUMMARY OF THE INVENTION

Solder-carbon nanostructure composites and methods of making and using thereof are described herein. The solder-carbon nanostructure composites contain a plurality of carbon nanostructures, having lengths in the range of 1-1000 microns, comprising a metal coating thereon which are dispersed within a solder material; where the plurality of carbon nanostructures comprises defects thereon due to exposure to a plasma treatment, an acid bath treatment, or due to the growth process of the plurality of carbon nano structures; and/or where the plurality of carbon nanostructures comprises functional groups thereon due to a polymer wrapping the plurality of carbon nanostructures.

In one method of forming the solder-carbon nano structure composites described herein, the method can include the steps of:

(1) forming or providing a carbon nanostructure array;

(2) optionally encapsulating the carbon nanostructures of the carbon nanostructure array in a suitable encapsulant, which is a polymer-based material;

(3) optionally exposing the optionally encapsulated carbon nanostructure array to a treatment that produces defect sites on the carbon nanostructures;

(4) optionally removing the encapsulant;

(5) depositing or forming a metal-based coating on the carbon nanostructures of the array formed during step (3);

(6) infiltrating the carbon nanostructures of the array with a molten solder material;

(7) allowing the mixture to cool in order to form the solder-carbon nanostructure composite wherein the carbon nanostructures are dispersed within the composite; and (8) optionally encapsulating the solder-carbon nanostructure composite in a polymer or blend of polymers.

In a second method of forming the solder-carbon nanostructure composites described herein, the method can include the steps of:

(1) forming or providing a carbon nanostructure array;

(2) optionally encapsulating the carbon nanostructures of the carbon nanostructure array in a suitable encapsulant, which is a polymer-based material;

(3) optionally exposing the optionally encapsulated carbon nanostructure array to a treatment that produces defect sites on the carbon nanostructures;

(4) optionally removing the encapsulant;

(5) depositing or forming a metal-based coating on the carbon nanostructures of the array formed during step (3); and (6) infiltrating the carbon nanostructures of the array with a molten solder material, where the solder material remains in a liquid state; and (7) optionally encapsulating the solder-carbon nanostructure composite in a polymer or blend of polymers.

In still a third exemplary method of forming the solder-carbon nanostructure composites described herein, the method can include the steps of:

(1) forming or providing a carbon nanostructure array;

(2) encapsulating the carbon nanostructures of the carbon nanostructure array in a suitable encapsulant, which is a polymer-based material;

(3) depositing or forming a metal-based coating on the encapsulated carbon nanostructures of the array;

(4) infiltrating the encapsulated carbon nanostructures of the array with a molten solder material;

(5) allowing the mixture to cool in order to form the solder-carbon nanostructure composite wherein the carbon nanostructures are dispersed within the composite; and (6) optionally encapsulating the solder-carbon nanostructure in a polymer or blend of polymers.

The solder-carbon nanostructure composites described herein can be used in various applications, such as thermal applications. For example, the solder-carbon nanostructure composites described may be placed or affixed in between a heat source and a heat sink or heat spreader, such as between an integrated circuit package and a heat exchanger, to improve the transfer of heat from the heat source to the heat sink or spreader.

In certain embodiments, the solder-carbon nanostructure containing composites described herein can be used as thermal interface materials (TIMs) in personal computers, server computers, memory modules, graphics chips, radar and radio-frequency (RF) devices, disc drives, displays, including light-emitting diode (LED) displays, lighting systems, automotive control units, power-electronics, solar cells, batteries, communications equipment, such as cellular phones, thermoelectric generators, and imaging equipment, including MRIs.

DETAILED DESCRIPTION OF THE INVENTION

Figure 1:
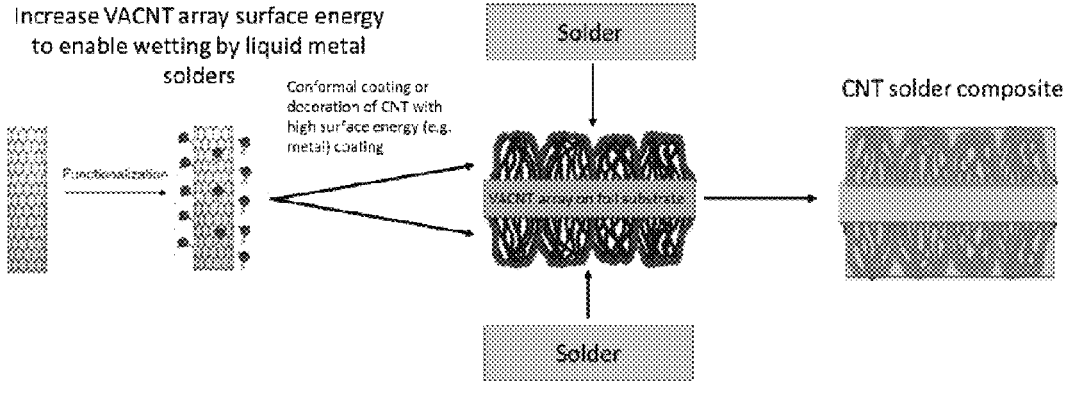
FIG. 1 shows a schematic representation of the method of making a solder-carbon nanotube composite whereby functionalization of a vertically aligned carbon nanotube array (VACNT) is followed by conformal coating with a high surface energy coating, such as a metal coating, and a molten solder in applied to the coated VACNT array to form the CNT solder composite.

Solder-carbon nanostructure composites and methods of making and using thereof are described herein.

I. Definitions

"Substrate" or "support", as used herein, refers to the material on which the nanotubes are grown. A variety of materials can serve as a support. Generally, the support is inert, meaning that the support does not chemically participate in the formation of nanotubes on the multilayer substrate. In some embodiment, the support is formed at least in part from a metal including, but not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above.

"Conformal," or "Conformally Coated," as used herein means covering a surface topography of an object such that it is completely or effectively covered and the covered surface is free or substantially free of pin holes or other defects which expose the underlying material of the object.

"Carbon Nanotube Array" or "CNT array" or "CNT forest", as used herein, refers to a plurality of carbon nanotubes which are vertically aligned on a surface of a material, such as a substrate or support. Carbon nanotubes are said to be "vertically aligned" when they are substantially perpendicular to the surface on which they are supported or attached. Nanotubes are said to be substantially perpendicular when they are oriented on average within 30, 25, 20, 15, 10, or 5 degrees of the surface normal.

"Polymer coating" as used herein, generally refers to polymers or molecules that bond to CNTs through van der Waals bonds, $\pi$-$\pi$ stacking, mechanical wrapping and/or covalent bonds and bond to metal, metal oxide, or semiconductor material surfaces through van der Waals bonds, $\pi$-$\pi$ stacking, and/or covalent bonds.

"Thermal Interface Material" (TIM), as used herein, refers to a material or combination of materials that provide high thermal conductance and mechanical compliance between a heat source and heat sink or spreader to effectively conduct heat away from a heat source.

"Coefficient of Thermal Expansion," as used herein, refers to a measure of a change in size, such as volume, per degree of change in temperature at a constant pressure.

"Electrical Conductivity," or "Specific Conductivity," as used herein, refer to the degree that a material can conduct an electric current, as is calculated as the ratio of the current density in the material to the electric field that causes the flow of current. It is the reciprocal of electrical resistivity. Electrical conductivity is typically reported in the SI units of Siemens per meter (S/m).

"Thermal contact resistance," as used herein, refers to when two surfaces are in thermal contact and resistance to heat transfer between the surfaces exists.

"Thermal conductivity," as used herein, refers to the transport of energy in the form of heat through a body of mass as the result of a temperature gradient and is determined as the heat energy transferred per unit of time and per unit of surface area divided by the temperature gradient. Thermal conductivity is typically expressed in units of W $m^{-1}$ $K^{-1}$.

"Tensile modulus," alternatively known as Young's modulus or the modulus of elasticity, as used herein, refers to a measure of the stiffness of a material and is a measure of the ratio of stress along an axis to the strain along the same axis. Tensile modulus can be used to describe the elastic properties of a material or object when stretched or compressed.

Numerical ranges disclosed in the present application include, but are not limited to, ranges of temperatures, ranges of pressures, ranges of weights, ranges of ratios, ranges of integers, ranges of conductance and resistance values, ranges of times, and ranges of thicknesses, etc. The disclosed ranges of any type, disclose individually each possible number that such a range could reasonably encompass, as well as any sub-ranges and combinations of sub-ranges encompassed therein. For example, disclosure of a thickness range is intended to disclose individually every possible thickness value that such a range could encompass, consistent with the disclosure herein.

Use of the term "about" is intended to describe values either above or below the stated value, which the term "about" modifies, in a range of approx. +/−10%; in other instances the values may range in value either above or below the stated value in a range of approx. +/−5%. When the term "about" is used before a range of numbers (i.e., about 1-5) or before a series of numbers (i.e., about 1, 2, 3, 4, etc.) it is intended to modify both ends of the range of numbers or each of the numbers in the series, unless specified otherwise.

II. Solder-Carbon Nanostructure Composites

A. Metal Substrates/Supports for Vertically Aligned Carbon Nanostructures

A variety of materials can serve as a support or substrate for vertically aligned arrays of tubular shaped nanocarbon (i.e., carbon nanotube) materials. In some embodiments, the substrate or support is formed at least in part from a metal, such as, but not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above. In other embodiments, materials can be, but are not limited to, ceramics and silicon or silicon compounds, such as silicon dioxide. In certain other embodiments, the substrate or support is a metallic foil, such, but not limited to, aluminum foil or copper foil.

In some embodiments, the surface of the support may be treated to increase adhesion of the carbon nanostructures to be formed via the inclusion of a suitable adhesion layer or surface treatment, which may include the use of plasma-assisted or chemical-based surface cleaning. Other treatments can include the deposition of a metal or metal oxide coating or particles on the support.

The substrate or support, and conditions under which a vertically aligned array of carbon nanostructures, such as carbon nanotubes (CNT), are formed, can be selected such that the support resists reacting with the catalyst, process gases, and/or residual gases through reactions, such as oxidation, silicidation, alloying, and/or carbide formation. For example, C, O, H, and N are the elements composing most CNT CVD process and contamination gases. Reaction conditions, such as temperature, can be selected in order to minimize adverse reactions of the support.

B. Vertically Aligned Carbon Nanostructures Forming Arrays

In certain embodiments, the carbon nanostructures form tubular structures (i.e., carbon nanotubes) which form vertically aligned forests or arrays. In particular embodiments, the vertically aligned carbon nanostructures are single, double, triple, or higher order multi-walled carbon nanotubes with diameters in the range from 10 to 40 nm, more preferably 15 to 30 nm, most preferably about 20 nm or less. The length of such other carbon nanostructures can range from 0.01 to 5,000 microns, preferably 0.1 to 2500 microns, preferably 0.1 to 2000 microns, more preferably 0.1 to 1000 microns.

In other embodiments, the carbon nanostructures can form, but are not limited to, fibers, wires, horns, cones, or other tube-shaped structures which have a high aspect ratio (i.e., greater than 1). The length of such other carbon nanostructures can range from 0.01 to 5,000 microns, preferably 0.1 to 2500 microns, preferably 0.1 to 2000 microns, more preferably 0.1 to 1000 microns.

In preferred embodiments, the vertically aligned carbon nanostructure arrays contain a plurality of carbon nanotubes which are vertically aligned on the surface of a metal or metal containing support or substrate.

In certain embodiments, the carbon nanostructure arrays are grown on the substrates described via chemical vapor deposition. Other methods of growing vertically aligned carbon nanostructure arrays are known in the art. Generally, the nanotubes are present at a sufficient density such that the nanotubes are self-supporting and adopt a substantially perpendicular orientation to the surface of the substrate or support. In some embodiments, the nanotubes forming the array are oriented, on average, within 30, 25, 20, 15, 10, or 5 degrees of the surface normal of a line drawn perpendicular to the surface of the substrate or support. Preferably, the nanotubes are spaced at optimal distances from one another and are of uniform height.

In certain embodiments, the carbon nanostructure are carbon nanotubes with a density on the support or substrate surface that ranges from about $1\times10^7$ to $1\times10^{11}$ nanotubes per mm$^2$, more preferably from about $1\times10^8$ to $1\times10^{10}$ nanotubes per mm$^2$, most preferably from about $1\times10^9$ to $1\times10^{10}$ nanotubes per mm$^2$.

The carbon nanostructure arrays grown on the substrates contain defect sites thereon. For example, when the carbon nanostructures are carbon nanotubes the carbon nanotubes can contain defects, such as vacancies, interstitials, and most commonly bond rotations and non-hexagonal rings (e.g. 5-C pentagon defects). For the purposes of forming the solder-carbon nanostructure composites described the carbon nanostructure arrays grown on the substrates can be further exposed to conditions which create more defect sites on the carbon nanostructures, if desired. For example, as discussed in the method of making section below, the carbon nano structure arrays grown on the substrates can be exposed to a plasma-based treatment (i.e., oxygen plasma), and/or an acid bath treatment (i.e., nitric acid bath) in order to create additional defect sites on the carbon nanostructures of the array, as compared to arrays which were not treated with plasma and/or acid bath treatments. The introduction of defect sites facilitates and improves the ability to deposit metals and mixtures thereof to form the metal-based coating described in Section C immediately below. However, as described herein, plasma and/or acid treatments can damage or destroy the carbon nanostructure arrays grown on the substrates and prior to exposing the arrays to such treatments it is necessary to encapsulate the carbon nanostructures of the arrays grown on the substrates in a suitable encapsulant, such as a polymer coating.

Accordingly, after formation of the carbon nanostructure arrays grown on the substrates an encapsulant is applied to form a protective layer on the carbon nanostructures (i.e., carbon nanotubes) of the array. The encapsulant is a polymer-based coating formed of, but not limited, to one or more polymers selected from conjugated polymers, non-conjugated polymers, and/or aromatic polymers. In some instances, the polymer is a thermoplastic elastomer, such as a polyester-based polyurethane or styrene-ethylene-butylene-styrene, polyimide, polyamide, or blends thereof. The polymer-based coating can be spray coated or the array of vertically aligned carbon nanostructures can be dipped into a polymer solution. In some other embodiments, the polymer-based coating contains one or more oligomeric materials, polymeric materials, or combinations thereof. In certain embodiments, the polymer may be selected from poly (3,4-3thylenedioxythiophene) poly(styrenesulfonate) (PEDOT:PSS), poly(3,4-3thylenedioxythiophene) (PEDOT), polythiophenes (including alkyl-substituted polythiophenes), polystyrenes, silicones, polysiloxanes, polypyrroles, polyacetylenes, polyanilines, polyfluorenes, polyphenylenes, polypyrenes, polyazulenes, polynaphthalenes, polycarbazoles, polyindoles, polyazepines, poly(3,4-ethylenedioxythiophenes), poly(p-phenyl sulfides), and poly (p-phenylene vinylene), polyacetylenes, polydiacetylenes, and blends thereof. In certain instances, the polymer may be selected from silicones or polysiloxanes. The polymer classes listed above include substituted polymers, wherein the polymer backbone is substituted with one or more functional groups, such as alkyl groups. The polymers may have any suitable weight average molecular weight or polydispersity. In some instances, the weight average molecular weight may be in a range of between 2,000 Da and 750,000 Da and sub-ranges disclosed therein.

The encapsulant can provide a protective barrier for the carbon nanostructures (i.e., carbon nanotubes) of the array when they are exposed to plasma and/or acid bath treatments allowing for the introduction of defect sites into the carbon nanostructures (i.e., carbon nanotubes) of the array by preventing destruction of the carbon nanostructures (i.e., carbon nanotubes), such as by oxidation, and/or delamination of the carbon nano structures (i.e., carbon nanotubes) from the substrate they were grown from. Further, the polymer-based coating forms a semi-porous membrane over the carbon nanostructures (i.e., carbon nanotubes) of the array where the pores enable access to the underlying structure during the plasma and/or acid bath treatments. This allows for the introduction of defect sites in a controlled manner that can prevent excessive damage of the carbon nanostructures (i.e., carbon nanotubes) of the array. As discussed in more detail below, the encapsulant (i.e., protective layer) can be subsequently removed by applying a solvent after the plasma and/or acid bath treatments have introduced the additional defect sites. Or, in some instances, treatments such as oxygen plasma, can etch away the encapsulant (i.e., protective layer) during exposure and the encapsulant (i.e., protective layer) acts as a sacrificial layer.

In some instances, the polymer encapsulant (such as when it is a conjugated polymer), may itself be used to act as a non-covalent functionalization mechanism for the carbon nanostructure's (i.e., carbon nanotube's) sidewalls. Aromatic molecules such as pyrene, porphyrin, polyacetylene, polythiophene, polyfluorene, polypyrrole and poly(phenylene vinylene) and their derivatives on the polymers can interact with the sidewalls of carbon nanotubes by means of π-π stacking and van der Waals interactions between the conjugated polymer chains containing aromatic rings and the surfaces of carbon nanotubes. The polymers may have any suitable weight average molecular weight or polydispersity. In some instances, the weight average molecular weight may be in a range of between 2,000 Da and 750,000 Da and sub-ranges disclosed therein. These polymers can wrap around the nanotubes and may serve as functionalization sites through functional groups incorporated into the polymer itself, through nanoparticle dispersions incorporated into the polymer matrix, or by modifying the surface energy mismatch between the carbon nanostructure and a subsequent metal-based coating deposited thereon. Exemplary functional groups on the polymers include, for example, phosphine, phosphonates, phosphonic acids, diphosphene, sulfonates, thiols, amines, amides, carboxylic acids, carboxylates, haloalkanes (such as $C_1$-$C_{10}$ alkanes containing halogen substituents), hydroxyls, ethers, esters groups, or combinations thereof. In such instances, described in this paragraph, the encapsulant wrapped carbon nanostructures of the array not need be treated in order to create additional defects and may be coated with a metal coating as detailed herein.

Figure 2:
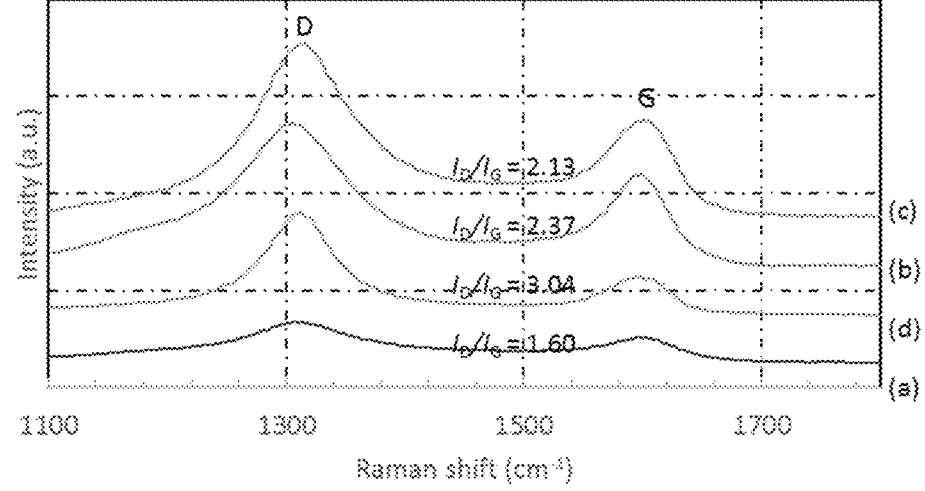
FIG. 2 shows a graph of Raman spectra where a shift of samples D and G peaks for: (a) an as grown CNT array w amorphous carbon and after oxygen plasma treatment for (b) 1, (c) 2, and (d) 3 minutes are shown.

Following treatment (i.e., plasma-based or acid bath) of the carbon nanostructures of the array to introduce additional defects, these can be referred to as defect-containing carbon nanostructures (i.e., carbon nanotubes) of the array. "Defect-containing" carbon nanostructures (i.e., carbon nanotubes) refers to carbon nanostructures (i.e., carbon nanotubes) that contain more/added defects as compared to the carbon nanostructures (i.e., carbon nanotubes) before the treatment. In some instances, the defect-containing carbon nanostructures (i.e., carbon nanotubes) of the array contain about 1% to 50%, 1% to 40%, 1% to 30%, 1% to 25%, 1% to 20%, 1% to 15%, 1% to 10%, or 1% to 5% more defects relative to the amount of defects in the as formed and untreated carbon nanostructures (i.e., carbon nanotubes) of the array. Methods of determining amounts of defects in the carbon nanostructures include, for example, Raman spectroscopy where an increase in the G peak (~1575 cm-1) peak relative to the D (~1350 cm-1) peak can be correlated with an increase in overall amorphous carbon and an increase in the number of defect sites in the array. In some instances, exposure to a treatment (such as a plasma-based or acid bath treatment) may first increase the D peak, as less preferred defects or such as adsorbates or amorphous carbon are removed from the array, before increasing the G band defects once the native CNT is fully exposed. FIG. 2 shows a measurement of Raman shift of samples after oxygen plasma treatment for 1, 2, and 3 minutes.

C. Metal-based Coating on Vertically Aligned Carbon Nanostructures Forming Arrays Following the formation of additional defect sites on the carbon nanostructures (i.e., carbon nanotubes) of the array, if desired, a metal-based coating is applied that improves the wettability and dispersability of the carbon nanostructures (i.e., carbon nanotubes) in solder material. Generally, the metal-based coating can be applied using any technique known in the art.

As noted above the introduction of additional defect sites allows for facile deposition or formation of a metal-based coating on the carbon nanostructures (i.e., carbon nanotubes) of the array. The metal-based coating can be a conformal coating, such as a nanoscale coating, formed of, but not limited to, a metal, metal alloy, and/or a metal oxide. In some embodiments, the metal can be, but is not limited to, aluminum, bismuth, cobalt, chromium, zinc, gallium, tantalum, platinum, gold, nickel, iron, tin, lead, silver, tungsten, titanium, indium, copper, or combinations or alloys thereof and/or one or more metal oxides, such as oxides of the metals listed above. In some instances, the conformal coating is not a continuous film, but instead a dense decoration of individual nanoparticles along the length of the carbon nanotube from tip to root. In some other instances, the metal-based coating need not be a conformal coating but instead may exist only at or near the tips of the array. This type of coating may be used to achieve a composite where, for example, the solder carbon nanostructure composite only exists in a thin film near the tips of the array and the remainder of the length of the array has no solder component and is instead carbon nanotubes only or substantially only carbon nanotubes, or is a carbon nanotube polymer composite of polymers named above as encapsulants.

In some particular instances, the metal-based coating is selected to match the solder material composition or match at least one or more metals present in the solder material into which the carbon nanostructures of the array are dispersed in. For example, most solders contain tin as the major component. Any suitable solder known in the art may be used. Thus, the metal-based coating can be selected to include tin and optionally one or more additional metals which are commonly used in solder alloys to improve the wettability and dispersability of the carbon nanostructures in a particular solder material in order to form the solder-carbon nanostructure composites.

In certain embodiments, the carbon nanostructures (i.e., carbon nanotubes) are conformally coated at the sidewalls of the CNTs and optionally at the tips of the carbon nanostructures (i.e., carbon nanotubes) or vice versa. In certain other embodiments, the carbon nanostructures (i.e., carbon nanotubes) are conformally coated at both the sidewalls of the carbon nanostructures (i.e., carbon nanotubes) and at the tips of the carbon nanostructures (i.e., carbon nanotubes). As discussed in the methods of making section below, in order to facilitate formation of the metal-based coating on the carbon nanostructures it is useful to introduce defect sites onto the carbon nanostructures, such as by a plasma and/or acid treatment. The introduction of defect sites by such treatments provides sites for metal deposition for formation of the metal-based coatings described herein.

In certain embodiments, at least about 100%, 99%, 98%, 97%, 96%, 95%, 90%, 80%, 70%, 60%, 50%, 40%, 30%, 20%, or 10% of the carbon nanostructures (i.e., carbon nanotubes) surface is coated by the metal-based coating. In certain non-limiting embodiments, the thicknesses of the metal-based coating, such as nanoscale conformal coating, can range from about 0.1 to 50,000 nanometers, 500 to 50,000 nanometers, 1 to 10,000 nanometers, 5 to 5,000 nanometers, 5 to 1,000 nanometers, 5 to 500 nanometers, 5 to 250 nanometers, 0.1 to 1,000 nanometers, 1 to 500 nanometers, 5 to 250 nanometers, more preferably 5 to 100 nanometers, 5 to 50 nanometers, or 5 to 25 nanometers.

In certain embodiments, the percentage of metal deposited onto the carbon nanostructures (i.e., carbon nanotubes) can be defined as a weight percentage determined using, for example, energy dispersive spectroscopy (EDS). For example, metal weight percent in metal coated arrays can be in a range of about 5 to 40% or 5 to 35% by weight. In some instances, the metal coated arrays demonstrate a metal-to-carbon weight ratio (determined by EDS, for example) in a range of about 0.1 to 1.5 or 0.1 to 1, while in other instances the ratio is about 0.1, 0.2, 0.3, 0.4, 0.5, 0.6, 0.7, 0.8, 0.9, 1, 1.1, or 1.2.

i. Deposition Methods for Metal-based Coatings

In certain embodiments, the metal-based coating can be deposited onto the plurality of vertically aligned carbon nanostructures (i.e., carbon nanotubes) forming the arrays to yield an optionally conformal metal coating on the carbon nanostructures (i.e., carbon nanotubes) prior to forming the solder-carbon nanostructure composites.

In some embodiments, one or more coatings of a metal, metal alloy, metal oxide, or combinations thereof of the metals named above can be applied using atomic layer deposition (ALD). In some other embodiments, one or more coatings of the metal, metal alloy, metal oxide, or combinations thereof can be vapor deposited onto the plurality of vertically aligned d carbon nanostructures (i.e., carbon nanotubes) forming the arrays, such as, via chemical vapor deposition (CVD). In still other embodiments, one or more coatings of the metal, metal alloy, metal oxide, or combinations thereof can be vapor deposited onto the plurality of vertically aligned carbon nanostructures (i.e., carbon nanotubes) forming the arrays, such as, via sputtering. ALD, for example, can be used to deposit the desired metal-based coating with high conformity and precise control of the thickness. The deposition is controlled at the atomic level by self-limiting surface reactions. Consequently, uniform and conformal deposition will occur on high aspect ratio porous structures because of self-passivating of the surface chemistry. Once the reaction is completed at one surface site, the reactants will continue to travel down the high aspect ratio pore and reach unreacted surface sites.

Methods of ALD, CVD, and sputter coating metal-based coating and the reaction conditions and equipment needed to achieve such metal-based coatings are well-known in the art. The selection of appropriate metal precursors for formation of desired metal-based coatings made of, but not limited to, aluminum, bismuth, cobalt, chromium, zinc, gallium, tantalum, platinum, gold, nickel, iron, tin, lead, silver, tungsten, titanium, indium, copper, or alloys/combinations are also known. In one instance, one may sputter coat a metal-based coating containing tin doped with chromium onto the carbon nanostructures. This can be matched to the composition of a commercial solder, for example, C-Solder sold by Goodfellow USA comprises 90-100% tin, 0.01-1% copper, 3-5% silver, and 2-6% chromium.

In some instances the metal-based coating can be multi-layer coating, with, for example, an carbon nanostructure adhesion layer, an solder adhesion layer, and an low reactivity layer. Examples of carbon nanostructure (i.e., carbon nanotube) adhesion layer may be made of metals including Ti, or Cr. A solder adhesion layer may be made of metals including tungsten, copper, aluminum, nickel, tin, indium, lead, bismuth or alloys/combinations thereof. The low reactivity layer materials may include platinum, gold, and silver. In some instances a layer may perform more than one function, such that there are only one or two of the aforementioned layers.

In certain non-limiting examples, the surface of the plurality of vertically aligned carbon nanostructures (i.e., carbon nanotubes) forming the arrays are coated via ALD with a platinum coating. The platinum coating may have any suitable thickness but may be, in some instances, a 20 nm thick coating. Platinum, for example, is useful for the solder-carbon nanostructure composites because it is a low reactivity metal that is believed to enable fluxless infiltration of the array by molten solder materials. There is also a wide variety of platinum precursors readily available for use in ALD processes.

A common limitation in metal deposition using ALD is the availability of reducing agents that can adsorb and react exothermically with surface-adsorbed metal precursors allowing ALD to proceed at temperatures<350° C. Of all ALD metal deposition processes, ALD tungsten (W) is a thermodynamically favorable process that uses tungsten hexafluoride ($WF_6$) and silane ($SiH_4$) or disilane ($Si_2H_6$) as reactants. An advantage of using W as the metal coating in some instances is that its high atomic number makes the resultant composite effective at preventing transmission of radiation. This is especially valuable for applications such as protection of electronics that must operate in environments such as space, where cosmic radiation bombardment is common.

In some instances, a nanoscale alumina coating is deposited prior to metal deposition of the metal-based coating which can serve to functionalize and improve conformal deposition and adhesion of a successively coated metal-based coating on the array.

In certain other non-limiting embodiments, the metal-based coating is formed by a wet coating method. In such methods, the surface of the plurality of vertically aligned carbon nanostructures (i.e., carbon nanotubes) forming the arrays is infiltrated with a liquid phase containing metal precursors which can be decomposed to the elemental metals thereby forming and depositing metal on the surface of carbon nanostructures (i.e., carbon nanotubes), particularly at the defect sites present which promote metal formation/deposition from the precursors. The decomposition of the metal precursors and formation of the metal-based coating therefrom is usually achieved by submerging the carbon nanostructures (i.e., carbon nanotubes) forming the arrays into an appropriate solvent containing the metal precursor(s) dissolved therein and applying heat, under an inert environment, to thermally decompose the metal precursor(s) and form the coating. Exemplary precursors include, but are not limited to, metal isopropoxides, metal hydrides (such as, without limitation, titanium hydride, $AlH_3\{O(C_4H_9)_2, AlH_3\{N(CH_3)_3\}\}$), galistan, and metal salts. Metal salts can include, without limitation, silver nitrate, silver neodecanoate, silver oxalate, silver acetate, silver tartarate, silver hexafluoroacetylacetonate cyclooctadiene, copper acetate, copper formate tetrahydrate, copper formate, copper glycolate, copper lactate, copper oleate, copper hydroxide, nickel sulfate, and nickel acetate. Details for wet coating methods to form the metal-based coating are described in the manufacturing methods below.

Without wishing to be bound by any particular theory, modification of the carbon nanostructures (i.e., carbon nanotubes) by formation of defect sites thereon facilitates the deposition of one or more metal-based coatings, which in turn can allow for better/improved wetting of a solder material to the carbon nanostructures (i.e., carbon nanotubes) of the arrays in order to form the solder-carbon nanostructure composites described herein.

In certain embodiments, the one or more metal-based coatings applied to the CNTs which modify the wetting properties also modify and improve the dispersibility of the carbon nanostructures (i.e., carbon nanotubes) of the arrays when placed into contact with a molten solder. The modified wetting and dispersibility properties permit the carbon nanostructures (i.e., carbon nanotubes) of the arrays, up to 1000 microns or longer, to be uniformly dispersed within the solder-carbon nanostructure composite formed. "Uniformly dispersed," as used herein refers to carbon nanostructures which are dispersed within the resulting metal-based composite with a high or substantially high degree of uniformity and homogeneity throughout the entirety of the resulting metal-carbon nanostructure composite. The uniformity and homogeneity of the carbon nanostructures dispersed within the composite can be determined via techniques such as, but not limited to, scanning electron microscopy (SEM), transmission electron microscopy (TEM), x-ray diffraction (XRD), and neutron scattering.

In certain embodiments, the modification of the wettability results in improved dispersibility of the metal coated carbon nanostructures (i.e., carbon nanotube) of the array, when placed into a melt of the solder. In some non-limiting embodiments, the metal coated carbon nanostructures (i.e., carbon nanotube) of the array is added/mixed into a suitable molten solder material in order to form a solder-carbon nanotube composite. In some non-limiting embodiments, the metal coated carbon nanostructures (i.e., carbon nanotube) of the array is dipped into a suitable molten solder material, where the temperature of the melt is less than the melting temperature of the support/substrate on which the carbon nanostructures (i.e., carbon nanotube) array is formed on in order to preserve the structure of the substrate/support and vertical orientation of the CNT array.

D. Solder-Carbon Nanostructure Composites

The solder-carbon nanostructure composites described herein contain a plurality of carbon nanostructures (i.e., carbon nanotubes) dispersed therein. In certain embodiments, the solder of the composites is a metal or metal alloy wherein the metal is selected from, but not limited to, aluminum, bismuth, copper, cobalt, chromium, gallium, zinc, tantalum, platinum, gold, nickel, iron, tin, lead, silver, titanium, indium, and alloys thereof. In some stances the solder material of the composite is a gold-tin solder, a tin-silver-copper solder, a tin-copper solder, a tin-lead solder, a tin-chrome solder a gallium solder, a gallium-indium-tin solder, or an indium solder. In some cases, the solder is a commercial solder material known in the art, such as a lead-free solder. Solders are typically formed primarily of tin optionally alloyed with other metals. The composition of the solder materials can be chosen to have any suitable melting temperature or melting temperature range of about −19 to 300° C. The composition of the solder materials can be chosen to have any suitable tensile strength and are typically in a range of about 0.15 to 40 kilo-pounds per square inch.

In certain instances, the solder material may be chosen to remain in its liquid state during operation, for example gallium-indium-tin solders. In these instances, the solder-carbon nanostructure composites disclosed rely on the mechanical strength of the carbon nanostructures to provide structural integrity to the solder-carbon nanostructure composite. The solder, in its liquid state, remains substantially inside the carbon nanostructure array due to its affinity to the metal coating that has been applied to the carbon nanostructures. In some cases, where the solder remains in a liquid state, the solder-carbon nanostructure composite is present at an interface (such as between two plates) and an external force, such as a clamping force may be employed, by way of the use of bolts, nuts, clips, pins, rivets, adhesives or epoxies to maintain contact at the interface to account for the solder component being in its liquid state and hold the composite together.

In some embodiments, the plurality of carbon nanostructures (i.e., carbon nanotubes) dispersed with the solder of the composite are unbundled structures. In some other embodiments, the plurality of nanocarbon structures dispersed with the solder of the composite are substantially unbundled structures showing some degree of bundling, typically less than 15%, less than 10%, less than 5%, or less than 1% bundling. "Bundling," as used herein, typically refers to a grouping of at least two or more carbon nanostructures. In some embodiments, the plurality of carbon nanostructures are uniformly dispersed within the solder-carbon composite formed, showing a high or substantially high degree of uniformity and homogeneity throughout the entirety of the resulting metal-carbon nanostructure composite. Methods for characterizing the uniformity of the dispersed carbon nanostructures in the solder-based composite include, but are not limited to, scanning electron microscopy (SEM), transmission electron microscopy (TEM), energy dispersive X-ray spectroscopy (EDX), and X-ray photoelectron spectroscopy (XPS).

In certain embodiments, the filling ratio, which is the proportion of dispersed carbon nanostructures in the solder-based composite in weight percent, is in the range of about 0.1 to 90%, 1-80%, 1-70%, 1-60%, 1-50%, 1-40%, 1-30%, 1-20%, and 1-10%.

In some embodiments, at least one of the carbon nanostructures (i.e., carbon nanotubes) dispersed in the solder of the composite has a length in a range from 0.01 to 5,000 microns, preferably 0.1 to 2500 microns, preferably 0.1 to 2000 microns, more preferably 0.1 to 1000 microns. In some embodiments, the length of at least one of the carbon nanostructures (i.e., carbon nanotubes) forming the plurality of carbon nanostructures is in the range of 100-1000 microns.

In certain embodiments, the metal support or substrate on which the carbon nanostructures (i.e., carbon nanotubes) of the array was formed is the same metal as that of the metal solder of the composite formed. In certain other embodiments, the metal support or substrate is a different metal.

In some embodiments, the solder-based composites contain carbon nanostructures dispersed therein, such as carbon nanotubes, which are aligned along a plane of the metal-carbon composite formed. In certain embodiments, the carbon nanotubes can be controllably aligned along the in-plane direction. In certain other embodiments, the carbon nanotubes can be controllably aligned along the cross-plane direction. In certain other embodiments, the carbon nanotubes can be controllably aligned along an intermediate-plane direction.

In certain embodiments, the solder-carbon nanostructure composites described herein have thermal or electrical conductivities which are at least equivalent to that of a solder material containing no carbon nanostructures dispersed therein.

In certain other embodiments, the solder-carbon nanostructure composites described herein have thermal or electrical conductivities which are at least 50%, 60%, 70%, 80%, 90%, 95%, 96%, 97%, 98%, or 99% equivalent to that of a solder containing no carbon nanostructures dispersed therein. The percentages described refer to a comparison between the thermal or electrical conductivities of the composite to that of the solder material's pristine thermal or electrical conductivity.

In certain embodiments, the solder-carbon nanostructure composites described herein have electrical conductivities which are at least 100% or higher than of a pristine solder material, which does not contain any carbon nanostructures dispersed therein. In certain embodiments the electrical conductivities are up to about 105%, 110%, 115%, 120%, 125%, 130%, 135%, 140%, 145%, 150%, or higher for the solder-carbon nanostructure-containing composites described herein versus the pristine solder material. In certain other embodiments, the specific conductivities of the solder-carbon nanostructure composites are about 150%, 175%, 200%, or higher than that of the pristine solder which contains no carbon nanostructures dispersed therein.

In certain embodiments, the solder-carbon nanostructure composites described herein have thermal conductivities which are at least 100% or higher than of a solder material, which does not contain any carbon nanostructures dispersed therein. In certain embodiments the thermal conductivities of the composites are increased in an in-plane or cross-plane direction by greater than about 20%, 30%, 40%, 50%, 60%, 70%, or 80%, versus that of an equivalent pristine solder material.

In some embodiments, the solder-carbon nanostructure composites described herein have thermal resistances of less than about 5, 4, 3, 2, 1, 1.5, 1.0, 0.9, 0.8, 0.7, 0.6, 0.5, 0.4, 0.3, 0.2, 0.1, 0.05, or 0.01 $cm^2$ K/W.

In some embodiments, the solder-carbon nanostructure composites described herein have a thermal conductivity in the direction of the carbon nanostructure (i.e., carbon nanotube) alignment in the range of between about 1-2500 W/m·K, 1-2000 W/m·K, 1-1500 W/m·K, 1-1000 W/m·K, 1-500 W/m·K, 5-500 W/m·K, 5-400 W/m·K, 5-300 W/m·K, 5-200 W/m·K, 5-150 W/m·K, or 5-100 W/m·K. In some instances, the range is between about 4-65 W/m·K.

In certain embodiments, the solder-carbon nanostructure composites described herein have coefficients of thermal expansion which are about 50, 40, 30, 20, or 10% of the values for an equivalent pristine solder material. In some other instances, the nature of the solder-carbon nanostructure composites performance results in stresses from one side of an interface made with the composite (e.g. thermal expansion, shock and vibration, etc.) not being transferred or being transferred in a lesser magnitude to the other side of the interface made with the composite, as the carbon nanostructure of the array carries the stress instead of the solder material. "Lesser magnitude," as used herein refers to a transfer of less than about 100%, 90%, 80%, 70%, 60%, 50%, 40%, 30%, 20%, or 10% of the original magnitude of the stress experienced on the side of the interface to the other side.

In certain embodiments, the solder-carbon nanostructure composites experience a reduction in die shear strength or thermal performance after exposure to thermal cycling that is less than that of a similar solder only joint (i.e., a joint containing only solder) subjected to the same fatigue failure mechanism. In some instances, a joint that experiences fatigue failure when bonded with only solder or sintered silver and subjected to thermal cycling or elevated temperatures will maintain mechanical and thermal contact when bonded using a solder carbon nanostructure composite, such as those described herein.

In certain other embodiments, the solder-carbon nanostructure composites described herein have mechanical properties which are distinct from that of a pristine solder no carbon nanostructures dispersed therein. The solder-carbon nanostructure composites show a reduction in failure modes common to traditional solders, such as brittle failure, cracking due to thermal expansion, and whiskering. In some embodiments, the tensile modulus of the solder-carbon nanostructure composites is in a range of about 0.1 to about 10 GPa. In some embodiments, the tensile modulus of the solder-carbon nanostructure composites is about 30, 40, 50, 60, 70, 80, 90, or 100% of the value of the pristine solder.

III. Methods of Preparation of Solder-Carbon Nanostructure Composites

In the methods of forming the solder-carbon nanostructure composites described herein, a first method can include the steps of:

(1) forming or providing a carbon nanostructure array;

(2) optionally encapsulating the carbon nanostructures of the carbon nanostructure array in a suitable encapsulant, which is a polymer-based material;

(3) optionally exposing the optionally encapsulated carbon nanostructure array to a treatment that produces defect sites on the carbon nanostructures;

(4) optionally removing the encapsulant;

(5) depositing or forming a metal-based coating on the carbon nanostructures of the array formed during step (3);

(6) infiltrating the carbon nanostructures of the array with a molten solder material;

(7) allowing the mixture to cool in order to form the solder-carbon nanostructure composite wherein the carbon nanostructures are dispersed within the composite; and (8) optionally encapsulating the solder-carbon nanostructure composite in a polymer or blend of polymers.

In the methods of forming the solder-carbon nanostructure composites described herein, a second exemplary method can include the steps of:

(1) forming or providing a carbon nanostructure array;

(2) optionally encapsulating the carbon nanostructures of the carbon nanostructure array in a suitable encapsulant, which is a polymer-based material;

(3) optionally exposing the optionally encapsulated carbon nanostructure array to a treatment that produces defect sites on the carbon nanostructures;

(4) optionally removing the encapsulant;

(5) depositing or forming a metal-based coating on the carbon nanostructures of the array formed during step (3); and (6) infiltrating the carbon nanostructures of the array with a molten solder material, where the solder material remains in a liquid state; and (7) optionally encapsulating the solder-carbon nanostructure composite in a polymer or blend of polymers.

In the methods of forming the solder-carbon nanostructure composites described herein, a third exemplary method can include the steps of:

(1) forming or providing a carbon nanostructure array;

(2) encapsulating the carbon nanostructures of the carbon nanostructure array in a suitable encapsulant, which is a polymer-based material;

(3) depositing or forming a metal-based coating on the encapsulated carbon nanostructures of the array;

(4) infiltrating the encapsulated carbon nanostructures of the array with a molten solder material; and (5) allowing the mixture to cool in order to form the solder-carbon nanostructure composite wherein the carbon nanostructures are dispersed within the composite; and (6) optionally encapsulating the solder-carbon nanostructure composite in a polymer or blend of polymers.

In instances of the second method, the polymer encapsulant (especially conjugated polymers), may act as a non-covalent functionalization mechanism for the carbon nanostructure (i.e., carbon nanotube) sidewalls. Aromatic molecules such as pyrene, porphyrin, polyacetylene, polythiophene, polyfluorene, polypyrrole and poly(phenylene vinylene) and their derivatives on the polymer encapsulant can interact with the sidewalls of carbon nanotubes by means of π-π stacking and van der Waals interactions between the conjugated polymer chains containing aromatic rings and the surfaces of the carbon nanostructure (i.e., carbon nanotube) sidewalls. The polymers may have any suitable weight average molecular weight or polydispersity. In some instances, the weight average molecular weight may be in a range of between 2,000 Da and 750,000 Da and sub-ranges disclosed therein. These polymers can wrap around the nanotubes and may serve as functionalization sites through functional groups incorporated into the polymer itself, through nanoparticle dispersions incorporated into the polymer matrix, or by modifying the surface energy mismatch between the carbon nanostructure and a subsequent metal-based coating deposited thereon. Exemplary functional groups on the polymers include, for example, phosphine, phosphonates, phosphonic acids, diphosphene, sulfonates, thiols, amines, amides, carboxylic acids, carboxylates, haloalkanes (such as $C_1$-$C_{10}$ alkanes containing halogen substituents), hydroxyls, ethers, esters groups, or combinations thereof.

In the last steps of each of the exemplary methods described above, where the solder-carbon nanostructure composite is optionally encapsulated in a polymer or blend of polymers after formation of the composite, the encapsulant is typically a polymer-based coating formed of, but not limited, to one or more polymers selected from conjugated polymers, non-conjugated polymers, and/or aromatic polymers. In some instances, the polymer is a thermoplastic elastomer, such as a polyester-based polyurethane or styrene-ethylene-butylene-styrene, polyimide, polyamide, or blends thereof. The polymer-based encapsulant coating can be spray coated onto the composite or the composite can be dipped into a polymer solution. In some other embodiments, the polymer-based coating contains one or more oligomeric materials, polymeric materials, or combinations thereof. In certain embodiments, the polymer may be selected from poly(3,4-3thylenedioxythiophene) poly(styrenesulfonate) (PEDOT:PSS), poly(3,4-3thylenedioxythiophene) (PEDOT), polythiophenes (including alkyl-substituted polythiophenes), polystyrenes, silicones, polysiloxanes, polypyrroles, polyacetylenes, polyanilines, polyfluorenes, polyphenylenes, polypyrenes, polyazulenes, polynaphthalenes, polycarbazoles, polyindoles, polyazepines, poly(3,4-ethylenedioxythiophenes), poly(p-phenyl sulfides), and poly (p-phenylene vinylene), polyacetylenes, polydiacetylenes, and blends thereof. In certain instances, the polymer may be selected from silicones or polysiloxanes. The polymer classes listed above include substituted polymers, wherein the polymer backbone is substituted with one or more functional groups, such as alkyl groups. The polymers may have any suitable weight average molecular weight or polydispersity. In some instances, the weight average molecular weight may be in a range of between 2,000 Da and 750,000 Da and sub-ranges disclosed therein. It is believed that the secondary polymer coating may protect external surfaces from exposure to the solder material in the composite, when concerns such as corrosion, embrittlement, diffusion, electrical isolation, handling, or other reliability or installation concerns are relevant.

An non-limiting representation of the first method above, excluding the use of an optional encapsulant, is shown in FIG. 1. In certain embodiments, the methods described herein may be carried out in an inert non-reactive environment in order to prevent undesired chemical reaction(s).

A. Carbon Nanostructure Arrays

Exemplary methods of forming carbon nanostructure (i.e., carbon nanotube) arrays of step (1) in the above methods are described in this section.

In certain embodiments, the carbon nanostructures are tubular structures (i.e., carbon nanotubes) which form vertically aligned forests or arrays. In particular embodiments, the vertically aligned carbon nanostructures are single, double, triple, or higher order multi-walled carbon nanotubes.

In some embodiments, the vertically aligned carbon nanotube arrays, are supported on, or, alternatively, attached to, the surface of support or substrate, formed at least in part from a metal, such as, but not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above. In other embodiments, support materials can be, but are not limited to, ceramics and silicon or silicon compounds, such as silicon dioxide. In certain other embodiments, the substrate or support is a metallic foil, such, but not limited to, aluminum foil or copper foil.

The arrays can be formed via any suitable method known in the art for forming such arrays or forests on a substrate. In preferred embodiments, the array is formed of vertically aligned carbon nanostructures on a support or substrate. The carbon nanostructures are said to be "vertically aligned" when they are substantially perpendicular to the surface on which they are supported or attached. Carbon nanotubes are said to be substantially perpendicular when they are oriented on average within 30, 25, 20, 15, 10, or 5 degrees of the surface normal. Preferably, the nanotubes are spaced at optimal distances from one another and are of uniform height. In certain embodiments, the diameters of the carbon nanostructures is in the range from 10 to 40 nm, more preferably 15 to 30 nm, most preferably about 20 nm or less. The length of carbon nanostructures (i.e., carbon nanotubes) which form the arrays can range from 0.01 to 5,000 microns, preferably 0.1 to 2500 microns, preferably 0.1 to 2000 microns, more preferably 0.1 to 1000 microns. In other embodiments, the carbon nanostructures form, but are not limited to, fibers, wires, horns, cones, or other tube-shaped structures having a high aspect ratio (i.e., greater than 1) with lengths as described above.

In preferred embodiments, the carbon nanostructures (i.e., carbon nanotubes) are grown at a growth temperature that is less than the melting temperature of the metal or metal alloy substrate or support. In certain embodiments, the carbon nanostructures are grown at a growth temperature of between about 600° C. and about 660° C., more preferably between about 610° C. and about 650° C., most preferably between about 620° C. and about 640° C.

Any suitable carbon source gas may be utilized. In some embodiments, the carbon source gas is acetylene. Other suitable carbon source gases include ethene, ethylene, methane, n-hexane, alcohols, xylenes, metal catalyst gases (e.g., carbonyl iron), and combinations thereof.

In certain other embodiments, arrays of vertically aligned carbon nanostructures (i.e., carbon nanotubes) are fabricated on another surface, and can be transferred, using methods known in the art, to a support or substrate made of a metal, metal alloy, ceramic, silicon-based, or other suitable material.

In some embodiments, the carbon nanotube array is formed on one or both sides of the substrate or support.

B. Metal-based Coatings on Carbon Nanostructure Arrays

In the methods described, the carbon nanostructures of the arrays are coated with a metal-based coating, such as a nanoscale coating formed of, but not limited to, to one or more layers of a metal, metal alloy, or metal oxide. The metal-based coating improves the wettability and/or dispersability of the carbon nanostructures within the solder material forming the composite.

Prior to deposition or formation of the metal coating in step (5) of the first or second method, however, introduction of additional defects into the carbon nanostructures of the array may be pursued. In some instances, the method can rely only on the defects which were formed during the growth process of the carbon nanostructures where in such instances, step (3) of the first method above may be excluded (is considered optional). Introducing additional defect sites onto the carbon nanostructures beyond those found in the as formed arrays can be achieved in the first method described by steps: (2) encapsulating the carbon nanostructures of the carbon nanostructure array in a suitable encapsulant, which is a polymer-based material; and (3) exposing the encapsulated carbon nanostructure array to a treatment that produces defect sites on the carbon nanostructures. For example, when the carbon nanostructures are carbon nanotubes the carbon nanotubes can contain defects, such as vacancies, interstitials, and most commonly bond rotations and non-hexagonal rings (e.g. 5-C pentagon defects). In some instances, the use of the encapsulant polymer can also provide further functionalization of the carbon nanostructures. In such instances, the polymer encapsulant (especially conjugated polymers), may act as a non-covalent functionalization mechanism for the carbon nanostructure (i.e., carbon nanotube) sidewalls. Aromatic molecules such as pyrene, porphyrin, polyacetylene, polythiophene, polyfluorene, polypyrrole and poly(phenylene vinylene) and their derivatives on the polymer encapsulant can interact with the sidewalls of carbon nanotubes by means of $\pi$-$\pi$ stacking and van der Waals interactions between the conjugated polymer chains containing aromatic rings and the surfaces of the carbon nanostructure (i.e., carbon nanotube) sidewalls. The polymers may have any suitable weight average molecular weight or polydispersity. In some instances, the weight average molecular weight may be in a range of between 2,000 Da and 750,000 Da and sub-ranges disclosed therein. These polymers can wrap around the nanotubes and may serve as functionalization sites through functional groups incorporated into the polymer itself, through nanoparticle dispersions incorporated into the polymer matrix, or by modifying the surface energy mismatch between the carbon nanostructure and a subsequent metal-based coating deposited thereon. Exemplary functional groups on the polymers include, for example, phosphine, phosphonates, phosphonic acids, diphosphene, sulfonates, thiols, amines, amides, carboxylic acids, carboxylates, haloalkanes (such as $C_1$-$C_{10}$ alkanes containing halogen substituents), hydroxyls, ethers, esters groups, or combinations thereof.

By applying a treatment (i.e., plasma-based or acid bath) to the carbon nanostructures of the array it is possible to introduce additional defects and form defect-containing carbon nanostructures (i.e., carbon nanotubes) of the array. In some instances, the carbon nanostructures (i.e., carbon nanotubes) of the array contain about 1% to 50%, 1% to 40%, 1% to 30%, 1% to 25%, 1% to 20%, 1% to 15%, 1% to 10%, or 1% to 5% more defects relative to the amount of defects in the as formed and untreated carbon nanostructures (i.e., carbon nanotubes) of the array.

The carbon nanostructure arrays grown on the substrates have an optional encapsulant applied thereon in step (2) of the methods to form a protective layer on the carbon nanostructures (i.e., carbon nanotubes) of the array and/or to provide functionalization thereon. The encapsulant is a polymer-based coating formed of, but not limited, to one or more polymers selected from conjugated polymers, non-conjugated polymers, and/or aromatic polymers. In some instances, the polymer is a thermoplastic elastomer, such as a polyester-based polyurethane or styrene-ethylene-butylene-styrene, polyimide, polyamide, or blends thereof. In certain embodiments, the polymer may be selected from poly(3,4-3thylenedioxythiophene) poly(styrenesulfonate) (PEDOT:PSS), poly(3,4-3thylenedioxythiophene) (PEDOT), polythiophenes (including alkyl-substituted polythiophenes), polystyrenes, silicones, polysiloxanes, polypyrroles, polyacetylenes, polyanilines, polyfluorenes, polyphenylenes, polypyrenes, polyazulenes, polynaphthalenes, polycarbazoles, polyindoles, polyazepines, poly(3,4-ethylenedioxythiophenes), poly(p-phenyl sulfides), and poly (p-phenylene vinylene), polyacetylenes, polydiacetylenes, and blends thereof. In certain instances, the polymer may be selected from silicones or polysiloxanes. The polymer classes listed above include substituted polymers, wherein the polymer backbone is substituted with one or more functional groups, such as alkyl groups.

The encapsulant, polymer-based coating, can be spray coated or the array of vertically aligned carbon nanostructures can be dipped into a polymer solution. The polymer solution, for spray or dip coating, can be prepared in a suitable solvent for one or more polymers dissolved therein. The solvents can be organic solvents, such as tetrahydrofuran. The concentration of polymer in the polymer solution can be in a range of about 0.1 to 10 wt % or 0.1 to 5 wt % by volume of solvent. Optionally heating and/or vacuum may be applied to control or promote removal of the solvent during the wet processing of step (2) of the methods. In some other embodiments, the polymer-based coating contains one or more oligomeric materials, polymeric materials, or combinations thereof. Following step (2) the carbon nanostructures of the carbon nanostructure array may be covered by a porous or semi-porous membrane or film of the polymer-based encapsulant. It is believed that the polymer-based encapsulant membrane/film protects the carbon nanostructures from deleterious effects from treatments, such as plasma and acid treatments used in the first method. It is believed that the pores of the encapsulant, however, allow for these treatments to produce defect sites onto the carbon nanostructures through sites exposed by the pores while the non-porous parts of the membrane/film acts as a barrier to the treatments. Thus, the encapsulant can provide a protective barrier for the carbon nanostructures (i.e., carbon nanotubes) of the array when they are exposed to plasma and/or acid bath treatments by preventing destruction of the carbon nanostructures (i.e., carbon nanotubes), such as by oxidation, and/or delamination of the carbon nanostructures (i.e., carbon nanotubes) from the substrate they were grown from.

During the optional encapsulation process of step (2), solvent evaporation can introduce a capillary induced clumping of the carbon nanotubes of the arrays. In cases of plasma treatments, as discussed below, this can allow for greater plasma penetration on the exposed carbon nanotube sidewalls.

Exemplary treatments which can be applied during step (3) of the first or second methods above to produce/induce formation of defects onto the carbon nanostructures (i.e., carbon nanotubes) include, but are not limited to, a plasma-based treatment (i.e., oxygen plasma), and/or an acid bath treatment (i.e., nitric acid bath). Such treatments create additional defect sites on the carbon nanostructures of the array, as compared to arrays which were not treated with plasma and/or acid bath treatments. The introduction of defect sites facilitates and improves the ability to deposit metals and mixtures thereof to form the metal-based coating (s).

For plasma-based treatments, like oxygen plasma, these may be applied by placing the optionally encapsulated carbon nanostructures of the array a in suitable plasma treatment device or chamber. Methods of performing oxygen plasma treatments and controlling the parameters thereof are known in the art. In some instances, the power used during an oxygen plasma treatment is in the range of about 1 to about 20 Watts. The duration of the exposure during step (3) can be a time ranging from about 1 to about 60 seconds or about 1 to about 30 seconds.

For acid bath treatments, like a nitric acid bath, the optionally encapsulated carbon nanostructures of the array is exposed to acid by dipping the array into an acid containing solution in a container. In some other instances, dropwise addition of the acid containing solution onto the carbon nanostructures of the array may be used. The acid, such as nitric acid, is diluted in a suitable solvent, such as ethanol until a pH of about 1-2 is reached and the solution is used as described above. In some other instances, a higher pH is preferable, such as of pH 5-6. It has been observed that a pH in the 1-2 range may be more prone to tip based metal deposition in subsequent steps, while a higher pH (of 5-6) may result in a more uniform deposition along the length of the carbon nanostructure (i.e., carbon nanotube). An example reaction scheme (functionalization followed by metallization with Ag is shown below. Coating typically occurs in 1-5 minutes. After deposition is complete the solution may be allowed to boil off and the coated substrate may be removed from the bath and washed in water or other suitable solvent to stop the reaction.

The optional encapsulant (i.e., protective layer), if present, can be subsequently and optionally removed during step (4) of the first or second method above by exposing the carbon nanostructures of the array to solvent(s) that dissolve any encapsulant present or which remains after step (3). In some instances, treatments such as oxygen plasma, can etch away the encapsulant (i.e., protective layer) during exposure step (3) and the encapsulant (i.e., protective layer) acts as a sacrificial layer without need for removal of any encapsulant thereafter.

Following the formation of additional defect sites on the carbon nanostructures (i.e., carbon nanotubes) of the array following step (3) of the first method, a metal-based coating is applied to improve the wettability and dispersability of the carbon nanostructures (i.e., carbon nanotubes) in the solder material. Generally, the metal-based coating can be applied using any technique known in the art.

Following encapsulation of the carbon nanostructures (i.e., carbon nanotubes) of the array following step (2) of the third method, a metal-based coating is applied to improve the wettability and dispersability of the carbon nanostructures (i.e., carbon nanotubes) in the solder material. Generally, the metal-based coating can be applied using any technique known in the art.

Regarding the first and second methods, as noted above, the presence and/or introduction of defect sites allows for facile deposition or formation of a metal-based coating on the carbon nanostructures (i.e., carbon nanotubes) of the array. Additionally, the presence of encapsulant polymer may also provide functional groups that enable facile deposition or formation of a metal-based coating, when the encapsulant is present in either the first and/or the second methods. The metal-based coating can be a coating, such as a nanoscale coating, formed of, but not limited to, a metal, metal alloy, and/or a metal oxide. In some embodiments, the coating is made of one or more layers which can be, but is not limited to, made of aluminum, bismuth, cobalt, chromium, zinc, gallium, tantalum, platinum, gold, nickel, iron, tin, lead, silver, tungsten, titanium, indium, copper, or combinations or alloys thereof and/or one or more metal oxides, such as oxides of the metals listed.

In some particular instances, the metal-based coating in the methods is selected to match the solder material composition or match at least one or more metals present in the solder material into which the carbon nanostructures of the array are dispersed in. For example, most solders contain tin as the major component. Any suitable solder known in the art may be used. Thus, the metal-based coating can be selected to include tin and optionally one or more additional metals which are commonly used in solder alloys to improve the wettability and dispersability of the carbon nanostructures in a particular solder material in order to form the solder-carbon nanostructure composites.

In certain embodiments of the first or second method, the carbon nanostructures (i.e., carbon nanotubes) are coated at the sidewalls of the CNTs and optionally at the tips of the carbon nanostructures (i.e., carbon nanotubes) or vice versa. In certain other embodiments, the carbon nanostructures (i.e., carbon nanotubes) are conformally coated at both the sidewalls of the carbon nanostructures (i.e., carbon nanotubes) and at the tips of the carbon nanostructures (i.e., carbon nanotubes).

In some instances, capillary clumping may be induced within the carbon nanostructures through a process of first wetting the carbon nanostructure array with a suitable solvent capable of wetting the array, and then allowing the solvent to dry prior to subsequently coating with a metal according to the methods described. It is believed that this may more readily expose the sidewalls of the array, enabling the subsequent metal coating to penetrate more effectively past the tips of the carbon nanostructures of the array towards the roots of the nano structures.

In certain embodiments, at least about 100%, 99%, 98%, 97%, 96%, 95%, 90%, 80%, 70%, 60%, or 50% of the carbon nanostructures (i.e., carbon nanotubes) surfaces are coated by the metal-based coating. In certain non-limiting embodiments, the thicknesses of the metal-based coating, such as nanoscale conformal coating, can range from 0.1 to 1,000 nanometers, 1 to 500 nanometers, 5 to 250 nanometers, more preferably 5 to 100 nanometers, 5 to 50 nanometers, or 5 to 25 nanometers.

For the methods described, the metal-based coating may contain one or more coatings of a metal, metal alloy, metal oxide, or combinations thereof which can be applied using atomic layer deposition (ALD). The one or more coatings of the metal, metal alloy, metal oxide, or combinations thereof can be vapor deposited onto the plurality of vertically aligned carbon nanostructures (i.e., carbon nanotubes) forming the arrays, such as, via chemical vapor deposition (CVD) in certain other instances. In still other embodiments, one or more coatings of the metal, metal alloy, metal oxide, or combinations thereof can be vapor deposited onto the plurality of vertically aligned carbon nanostructures (i.e., carbon nanotubes) forming the arrays, such as, via sputtering.

Methods of ALD, CVD, and sputter coating metal-based coating and the reaction conditions and equipment needed to achieve such metal-based coatings are well-known in the art. The selection of appropriate metal precursors for formation of desired metal-based coatings made of, but not limited to, aluminum, bismuth, cobalt, chromium, zinc, gallium, tantalum, platinum, gold, nickel, iron, tin, lead, silver, tungsten, titanium, indium, copper, or alloys/combinations are also known.

For example, for vapor deposition methods used to deposit one or more coatings on the carbon nanostructures, generally, gas precursors containing the source material of the coating are deposited, such as by CVD or ALD fed into a closed chamber containing the encapsulated array. The chamber can be at atmospheric pressure or at various grades of vacuum. The chamber walls can be hot or a heated stage can be used with cold chamber walls to increase the deposition rate on the target object (i.e., CNTs of the array). Methods of forming thin films via CVD are well known in the art. See, for example, S. A. Campbell, *Science and Engineering of Microelectronic Fabrication, 2nd* Edition, Oxford University Press, New York (2001); incorporated herein in its entirety by reference. CVD deposition techniques of metals, as well as CVD deposition of metal oxides, such as aluminum oxide and silicon oxide are known. In certain embodiments, CVD deposition rates can be as low as 1 nm/cycle.

In certain non-limiting examples, the surface of the plurality of vertically aligned carbon nanostructures (i.e., carbon nanotubes) forming the arrays are coated via ALD with a platinum coating. The platinum coating may have any suitable thickness but may be, in some instances, a 20 nm thick coating. Platinum, for example, is useful for the solder-carbon nanostructure composites because it is a low reactivity metal that is believed to enable fluxless infiltration of the array by molten solder materials. There is also a wide variety of platinum precursors readily available for use in ALD processes. As noted earlier, a common limitation in metal ALD is availability of reducing agents that can adsorb and react exothermically with surface-adsorbed metal precursors allowing ALD to proceed at <350° C. Of all ALD metal deposition processes, ALD tungsten (W) is a thermodynamically favorable process that uses tungsten hexafluoride ($WF_6$) and silane ($SiH_4$) or disilane ($Si_2H_6$) as reactants.

In certain other non-limiting embodiments, the metal-based coating formed during step (5) of the first or second method or step (3) of the third method is alternatively formed by a wet coating method. In such methods, the surface of the plurality of vertically aligned carbon nanostructures (i.e., carbon nanotubes) forming the arrays is infiltrated with a liquid phase containing metal precursors which can be decomposed to the elemental metals thereby forming and depositing metal on the surface of carbon nanostructures (i.e., carbon nanotubes), particularly at the defect sites which promote metal formation/deposition from the precursors. The decomposition of the metal precursors and formation of the metal-based coating therefrom is usually achieved by submerging the carbon nanostructures (i.e., carbon nanotubes) forming the arrays into an appropriate solvent containing the metal precursor(s) dissolved therein and applying heat, under an inert environment, to thermally decompose the metal precursor(s) and form the coating.

In a wet coating method, metal precursors are dissolved in a suitable solvent and the solution is allowed to infiltrate the carbon nanostructures of the array in step (3), such as by submerging the array in the solution. Exemplary precursors can include, but are not limited to, metal isopropoxides (such as copper (II) isopropoxide, vanadium(V) oxytriisopropoxide, titanium (IV) isopropoxide), metal hydrides (such as titanium hydride, $AlH_3\{O(C_4H_9)_2$, $AlH_3\{N(CH_3)_3\}$), galistan (an alloy of tin, gallium, and indium), and metal salts (such, without limitation, silver nitrate, silver neodecanoate, silver oxalate, silver acetate, silver tartarate, silver hexafluoroacetylacetonate cyclooctadiene, copper acetate, copper formate tetrahydrate, copper formate, copper glycolate, copper lactate, copper oleate, and copper hydroxide) or palladium thiolate. Suitable solvents for dissolving the precursors include, for example, organic solvents such as alcohols (like ethanol, methanol, isopropanol), xylene, glycols (like ethylene glycol), glycol ether, aromatic solvents, aliphatic solvents, toluene, and acetone. Suitable mixtures of organic solvents are also possible. In some instances, the solution for dissolving precursors may comprise water and acids (such as formic acid). In some instances, the solution for dissolving precursors may optionally contain complexing agents and/or additives such as, but not limited to, ethylamine, propylamine, butyl-amine, hexylamine, n-dimethyloctylamine, diamines, ammonium hydroxide, formic acid, ethanolamine, 2-hydroxyethyl-cellulose, ethyl cellulose, or combinations thereof. The concentration of the metal precursors in the solvents can be any suitable concentration such as, but not limited to about 0.01 to 0.3 M, 0.01 to 0.2M, or 0.01 to 0.1M.

In some instances, where an amorphous carbon cap is present on the carbon nanostructures of the array there may be a need to perform an optional de-capping step prior to step (5) of the first or second method or step (3) of the third method, when a wet coating method is used, by boiling the array in an acetone bath for about 30 minutes. The de-capping step removes amorphous carbon from the array which can interfere with metal deposition during the wet coating method.

Once infiltrated by the solution the array is heated to a temperature sufficient to decompose the precursors to their elemental metal. The defects on the carbon nanostructures provide sites for attachment of the metals deposited on the carbon nanostructures. Thermal decomposition can be achieved by placing the solution infiltrated array in a furnace or in a microwave or under a plasma and heating to a temperature of at least about 50° C., 75° C., 100° C., 200° C., 250° C., 300° C., 350° C., 400° C., 450° C., or 500° C. Thermal decomposition temperatures used to decompose the precursors may be in a range from between about 100° C. to about 500° C. and any sub-ranges within. Thermal decomposition can also be achieved by exposing the solution infiltrated array to a plasma, such as a hydrogen plasma, sufficient to decompose the metal precursor. The decomposition temperature may be reached by heating the array at a suitable ramp rate of about 1° C./min or 2° C./min until the final desired temperature is achieved followed by holding at that temperature for at least about 5 to 30 mins, 5 to 25 mins, 5 to 20 mins, or 5 to 10 mins. The thermal decomposition process described is typically carried out under an inert atmosphere of nitrogen or argon. Following the hold time sufficient to decompose the precursors and form the metal coating on the carbon nanostructures, the array may be cooled to room temperature (25° C.) optionally at a controlled cooling rate of about 1° C./min, 2° C./min, or 3° C./min until cooled. In some other instances, the infiltrated arrays can be calcined under an inert atmosphere (i.e., argon) for at least about 1, 2, 3, 4, or 5 hours to decompose the metal precursor into its elemental form thereby depositing the metal, especially at the defect sites on the carbon nanostructures which attachment points for the metal. In some instances, subsequent to thermal decomposition the metal coated carbon nanostructures are dried for at least about 1 to 5 minutes and then plasma sintered.

In some other instances, in lieu of thermal decomposition, as described above, reduction of the metal precursors into elemental metal may be achieved, such as at lower temperatures and optionally without a need for heating, through the use of photo-curing. In photo-curing, the metal solution may be exposed to a high energy light source, for example ultraviolet light. Methods of photo-curing and selection of conditions, materials, and parameter thereof are known in the art. In some instances, where photo-curing is used to form metal coatings on the carbon nanostructures from suitable metal precursors, irradiance from a UV source may optionally be in a range of between about 0.1 W/cm$^2$ to 100 W/cm$^2$ for any suitable period of time needed to induce reduction of the metal precursors to elemental metal and forming a metallic coating on the carbon nanostructures of the array. In some instances, irradiance can be applied for a period of time ranging from between about 1 second to 1 hour.

In some instances of the methods, such as with wet coating the carbon nanostructures with galistan in acetone to form a metal coating, it can be important to control the pH of the solution to modify the wetting properties of the carbon nanostructures. For example, a pH of about 8 was needed to allow wetting of the carbon nanostructures (i.e., carbon nanotubes) of the array, as discussed in the examples. The pH of the solution can be modified using suitable acids or bases to improve wetting properties, as needed.

In certain embodiments, an optional thermal treatment may be applied following the deposition/formation of the metal-based coating in step (5) of the first or second method or step (3) of the third method onto the surface of the plurality of vertically aligned carbon nanostructures (i.e., carbon nanotubes) forming the arrays. For example, if the metal-based coating is a low melting temperature metal, such as tin or tin alloy, it may be beneficial to heat the coating above its melting temperature to further distribute it within the vertically aligned carbon nanostructures (i.e., carbon nanotubes) forming the arrays.

Following step (5) of the first or second method or step (3) of the third method, the metal coated carbon nanostructures of the arrays are infiltrated by molten solder material during steps (6) or step (4), respectively. The solder is a metal or metal alloy wherein the metal is selected from, but not limited to, aluminum, bismuth, copper, cobalt, chromium, gallium, zinc, tantalum, platinum, gold, nickel, iron, tin, lead, silver, titanium, indium, and alloys thereof. In some stances the solder material of the composite is a gold-tin solder, a tin-silver-copper solder, a tin-copper solder, a tin-lead solder, a tin-chrome solder, a gallium solder, a gallium-indium-tin solder or an indium solder. In some cases, the solder is a commercial solder material known in the art, such as a lead-free solder. Solders are typically formed primarily of tin optionally alloyed with other metals. The composition of the solder materials can be chosen to have any suitable melting temperature or melting temperature range of about −19 to 300° C. The melt can be formed by heating the solder to the appropriate temperature to form a melt thereof and introducing the metal coated carbon nanostructures of the arrays therein. The solder material can be melted in using any suitable heating means, such as an oven, in any suitable container for carrying out infiltration step (6) of the first method or infiltration step (4) of the second method.

Infiltration by molten solder during step (6) of the first or second method or infiltration step (4) of the third method can be carried out via several approaches. In one instance, the prepared array (functionalization and conformal metal coating) can be dip coated into the molten solder bath for infiltration. Alternatively, the solder can be applied only to the tips of the carbon nanostructures of the array, either in film or sheet form, or deposited in thin film form via sputtering or jet vapor deposition (JVD). In such cases, after application of the thin film of solder to the carbon nanostructures of the array, the solder may be reflowed to wet and infiltrate the array either in ambient air, in vacuum, or under inert (e.g. argon) environment, submerged or coated in a solder flux, in a formic acid or forming gas vapor environment when flux is undesirable, under pressure, or any combinations of the aforementioned.

In some instances, the infiltration of step (6) of the first or second method or infiltration step (4) of the third method is performed for a period of time in the range of about 0.1-200 minutes, about 15-150 minutes, or about 20-120 minutes. Standing times may be varied as necessary depending on the choice of solder material. In some cases, during step (7) of the first method or infiltration step (5) of the third method the infiltrated array can controllably cooled down to one or more selected temperatures at a suitable cooling rate in the range of about 0.1 to about 50° C. min$^{-1}$. The cooling time will vary depending on the rate of cooling. In some other embodiments, gas, liquid, or flash cooling/rapid quenching techniques, which are known in the art, may be applied. Gases such as nitrogen and argon maybe used during cooling step (7) of the first method or infiltration step (5) of the third method. In some non-limiting embodiments, quenching the composite in a collection of liquid to induce rapid cooling can be applied as cooling method. In certain embodiments, after the composite has cooled and hardened it can be further subjected to an annealing process.

Optionally during step (6) of the first or second method or infiltration step (5) of the third method, mechanical mixing or agitation may be applied to control or improve the uniformity of the carbon nanostructures being dispersed throughout the resulting solder-carbon nanostructure composite. In some embodiments, the application of mechanical mixing or agitation may be used to decrease the time needed to achieve a uniform dispersion of the carbon nanostructures in the molten solder material.

In certain embodiments, the solder-carbon nanostructure composites described herein, may be prepared by casting to form the composite as a sheet, plate, foil, rod, wire, strip, ingot, pellet, or chunk.

In certain other embodiments, the substrate or support may be formed of material which is resistant to high temperatures and can be recovered after addition to the molten solder and reused. In some embodiments, the reusable substrate having an array formed on one or both sides can be dipped into the molten solder material in a controlled manner in order to release the carbon nanostructures (i.e., carbon nanotubes) from the substrate into the molten solder. Exemplary materials from which high temperature resistant substrates can be formed include, but are not limited to, titanium, tungsten, ceramics and silicon-based materials. In some embodiments, the substrate or support melts at a higher temperature than the temperature of the molten solder material in order to keep the substrate intact and the array of carbon nanotubes in their original orientation after the molten solder infiltrates the carbon nanostructures (i.e., carbon nanotubes) of the array and solidifies.

IV. Uses of Solder-Carbon Nanostructure Composites

The solder-carbon nanostructure composites described herein can be used in various applications, such as thermal applications.

In certain embodiments, the solder-carbon nanostructure composites described may be placed or affixed in between a heat source and a heat sink or heat spreader, such as between an integrated circuit package and a heat exchanger, to improve the transfer of heat from the heat source to the heat sink or spreader.

In some embodiments, the solder-carbon nanostructure containing composites exhibit electrical conductivities, thermal conductivities, and mechanical properties which are distinct and improved from that of the pristine solder, which does not contain any carbon nanostructures dispersed therein.

In certain embodiments, the solder-carbon nanostructure containing composites described herein can be used as thermal interface materials (TIMs) in personal computers, server computers, memory modules, graphics chips, radar and radio-frequency (RF) devices, disc drives, displays, including light-emitting diode (LED) displays, lighting systems, automotive control units, power-electronics, solar cells, batteries, communications equipment, such as cellular phones, thermoelectric generators, and imaging equipment, including MRIs.

In some instances, a device may include the solder-carbon nanostructure composites, where the device attaches a semiconductor die or chip to a substrate or package. In certain examples, the solder-carbon nanostructure containing composites may be used for mounting electronic components, such as a semiconductor die or chip to its substrate or package. For example, the solder-carbon nanostructure composite attaches a semiconductor die or chip to a substrate or package. In some instances the solder-carbon nanostructure containing composites may be responsible for carrying heat and electricity through the layer, as well as mounting the device in place. In still some instances the conformal metal coating within the solder-carbon nanostructure containing composites provides a radiation shielding property protecting the underlying device from environmental radiation.

The solder-carbon nanostructure composites can be used in joint and have less die shear strength reduction or thermal performance reduction after exposure to thermal cycling (i.e., repeated thermal cycles) that is less than that of a similar solder only joint (i.e., a joint containing only solder) subjected to the same number of cycles and fatigue failure mechanisms (i.e., elevated temperatures). A joint that experiences fatigue failure when bonded with only solder or sintered silver and subjected to thermal cycling or elevated temperatures will maintain mechanical and thermal contact when bonded using a solder carbon nanostructure composite, such as those described herein.

EXAMPLES

Example 1: Solder-Carbon Nanotube Composites

Preparation of Vertically Aligned Carbon Nanotube Arrays on Aluminum Substrate

Vertically aligned forests of carbon nanotubes (CNTs) were grown on one or both sides of 50 μm thick Al foil using a low-pressure chemical vapor deposition process at 635° C. and 440 mbar in tube furnace connected to a mass flow controller that feeds argon, hydrogen, and $CH_2H_2$ as the carbon source gas. The growth time was varied from 30 min to grow forests of multiwalled CNTs ranging from 15 μm in height with an average CNT diameter of 15 nm.

Coating the Vertically Aligned Carbon Nanotube Arrays with an Encapsulant

In order to increase the availability of deposition sites in the carbon nanotube sidewalls, functionalization in the form of introducing strategic defects as sites for metal deposition was pursued. To prevent issues of destruction of the carbon nanotubes of the array a encapsulant made of a thin polyester-based polyurethane (TPU) coating was used to protect the carbon nanotubes of arrays formed.

The TPU coating was applied through wet processing using 3.0 TPU polymer wt. % in tetrahydrofuran. The solvent evaporation from this process introduced a capillary induced clumping of the carbon nanotube arrays. In cases of oxygen plasma treatment discussed below, this allowed for greater plasma penetration on the exposed CNT sidewalls. The resultant coating resulted in a semi-porous membrane covering the carbon nanotubes of the array.

Introducing Defect Sites onto the Encapsulated Vertically Aligned Carbon Nanotube Arrays Following the encapsulation with TPU, the array was subjected to either an acid bath treatment with nitric acid or an oxygen plasma treatment to introduce more defect sites on the walls of the carbon nanotubes.

Acid Bath Treatment

In one case, dropwise addition of concentrated (97%) nitric acid was performed to form a solution of pH 5.8 in ethanol. The array was exposed to the solution. The nitric acid produced defect sites on the side-walls of the carbon nanotubes at very low nitric acid concentration. However, the nitric acid also had a detrimental effect on the carbon nanotube-substrate adhesion because it attacked the iron catalyst which acts as the base anchor of the carbon nanotubes to the substrate. This resulted in delamination of the array into the nitric acid solution for carbon nanotube arrays that were not encapsulated by TPU.

$O_2$ Plasma Treatment

To preserve the adhesion of the CNT arrays to the substrate while introducing defect sites, $O_2$ plasma functionalization was also investigated. The plasma was 13.56 MHz RF-induced using 20 sccm $O_2$ at 100 mTorr. As grown CNTs were prone to destruction through oxidation from the $O_2$ plasma even at the lowest possible power setting to produce plasma (10 W) for a short time of 30 seconds, in the absence of an encapsulant on the array. Efforts to protect the array from destruction during plasma functionalization could be achieved by applying the encapsulant to the carbon nanotubes, as described above.

The pores of the semi-porous TPU membrane enabled 02 treatment in areas where pores in the polymer coating existed, without excessive destruction of the bulk carbon nanotube array. During 02 plasma treatment, the TPU coating acted as a sacrificial layer that was etched away in lieu of carbon nanotube destruction. The polymer-clumped carbon nanotube could withstand stronger and longer $O_2$ plasma treatment.

Deposition of Platinum onto the Carbon Nanotubes of the Array following Defect Introduction by Atomic Layer Deposition (ALD)

Atomic layer deposition (ALD) was used to deposit metals onto plasma treated carbon nanotube arrays protected by TPU encapsulant. Three metal coatings were demonstrated: platinum, tungsten, and tungsten with an alumina cap. Platinum was chosen as a deposition material due to its low reactivity which enables fluxless infiltration of the array by liquid metals like tin, good thermal conductivity, and relative availability of precursors for platinum for ALD deposition. The ALD process enabled deposition of 20 nm platinum coating on the carbon Nanotubes of the array. Tungsten was chosen because of its thermodynamically favorable low temperature process. Alumina cap was evaluated as a means of reducing the occurrence of more difficult to remove passivation state common to pure tungsten.

Energy-dispersive X-ray spectroscopy (EDX) confirmed that platinum was present from tip to root of the array. However, after coating, tube diameters were on the order of 25-45 nm along the z axis of the array, measured in an area near the tips. Measuring the tube diameters from a top view of the array, however, showed that features on the top surface of the array (the tips) were 45-60 nm thick. This suggested that the platinum was preferentially deposited at the tips, as compared to the side walls of the nanostructures.

Further indicative of the coating gradient from tip to roots was an observed tendency of the array to collapse at the roots into a much more narrow structure. Typically, the reverse was observed (collapse/clumping at the tips while the roots remain static) after an encapsulated array was exposed to a fluid that subsequently evaporated. The capillary action and volumetric expansion of the fluid associated with the evaporation process is known to exert force on the adjacent tubes, pulling the tubes together in channels adjacent to the fluid escape pathways. The collapse at the roots instead of the tips suggested that the platinum coating effectively froze the array near the tips, forming a semicontinuous coating that no longer allowed the individual nanotubes to slide independent of one another.

Along with the clumping at the roots of the array, further evidence that the platinum coating froze the carbon nanotube tips in place comes from thermal measurements of the coated array. Given that the platinum coating has a thermal conductivity of about 70 W/m-K (based on the properties of elemental platinum) one would expect the effective thermal conductivity of to increase over the 12 W/m-K of the uncoated array. However, when measured according to ASTM D5470 in a 1D steady state system, the measured thermal resistance of the platinum coated arrays were >4× that of the uncoated arrays. This strongly suggested that the platinum coating decreased the ability of the nanostructures to conform to the surfaces of the measurement bars, resulting in reduced contact area and higher thermal resistance. It is expected that reducing the coating thickness could minimize the tendency of the platinum coating to over stiffen the array.

Deposition of Metal Coatings onto the Carbon Nanotubes of the Array following Defect Introduction by Wet Coating Method A wet coating method (liquid phase infiltration method) was used for forming metal coatings on the carbon nanotube array. This method proceeded by decomposition of metal precursors dissolved in a solvent where the native metal attached to the carbon nanotube array after decomposition, preferably attaching to defects sites on the carbon nanotube array. Metal precursors included, silver nitrate, metal isopropoxides, metal hydrides, or Galinstan.

Several metallic solutions were investigated to create well dispersed metallic coatings inside of the carbon nanotube array, as follows:

| METAL PRECURSOR | SOLVENT |
| --- | --- |
| METAL ISOPROPDXIDES | Ethanol |
| METAL HYDRYIDES | Ethanol |
| GALINSTAN | Acetone |
| SILVER NITRATE | Ethanol |

Metal Isopropoxides

Three metal isopropoxides were investigated to determine their ability to infiltrate and coat the interior of the CNT array: Copper (Cu) (II) Isopropoxide, Vanadium(V) oxytri-isopropoxide, and Titanium (Ti) (IV) Isopropoxide. For each material, the metal isopropoxides were dissolved in anhydrous ethanol, then a carbon nanotube array was submerged in the solution and placed in a furnace. The metal isopropoxides were expected to thermally decompose to their base metal when exposed to high temperature in an inert environment, releasing the —OH groups in gas phase to the exhaust of the furnace. Each sample was heated to 450° C. at 2° C./min for 10 min and cooled to 25° C. at 3° C./min in a nitrogen atmosphere. After removal from the furnace each sample was inspected using a digital microscope to determine the morphology of the resultant coatings. The electrical resistance of each sample was also measured using a multimeter to confirm that a conductive (metallic) coating had been deposited on the array.

For all of the metal isopropoxide samples, significant destruction of the native carbon nanotube arrays, with large macroscopic spots present where the carbon nanotubes had been completely removed. In addition, the metal deposits tended to agglomerate into large clumps not suitable for further processing.

The samples with Cu and Ti deposits were moderately conductive after coating (5-6 ohms at a probe spacing of 1" in plane) indicating that the base metals were present, though with sufficient roughness and contact resistance to display a resistance that was about 5× that of the native array (~1 ohm at the same probe spacing).

The vanadium samples showed significantly higher resistances than the Cu and Ti deposits (~30 ohms). This may have been due to the observed differences in the coating behavior of the Va as compared to the other metals. The Va deposits were largely present on the foil substrate where the CNTs had been removed, with little metal deposits on the CNTs themselves. The Cu and Ti on the other hand both showed deposits on the CNT arrays themselves.

Titanium Hydride $TiH_4$ powder in an anhydrous ethanol solution was prepared and processed in the same manner as the metal isopropoxides discussed above. These samples provided far more uniform Ti coatings than any of the metal deposits derived from the metal isopropoxides solutions. For these samples the resistance was measured first at the tips of the carbon nanotube array using light pressure from the multimeter probes, and then again deeper into the array using greater contact force to create penetrations in the carbon nanotube/Ti composite for measurement. The resistance for this sample showed no discernible difference between top of the array and at a layer deeper in the array at 3.2 ohms. This As shown in Table 1 below, polymer (TPU) coated and uncoated arrays were treated by oxygen plasma at 10 or 20 W for 30 seconds up to 240 seconds. The polymer clumped carbon nanotubes could withstand stronger and longer plasma treatments, which increased the wt. ratio of silver to carbon on the carbon nanotubes, as evidenced by energy dispersive spectroscopy (EDS) analysis, up to a point where the carbon nanotube coverage on the substrate started to drop as shown in Table 1 below. The optimized plasma parameters were at 20 W power and for 120 seconds. Plasma power of 30 W was also investigated, however even at a 30 s treatment, significant carbon nanotube destruction was observed at this power.

TABLE 1

| EDS Analysis of Silver Coated CNT Arrays after $O_2$ Plasma Treatments | | | | | | |
|---|---|---|---|---|---|---|
| POLYMER COATED | POWER (W) | TIME (SEC) | CNT COVERAGE (%) | C WT. % | AG WT. % | AG-C WT. RATIO |
| NO | 10 | 30 | 34.8 | 18.9 | n/a | n/a |
| NO | 20 | 60 | 23.7 | 6.82 | 8.24 | 1.21 |
| YES | | 60 | 77.8 | 62.4 | 9.63 | 0.154 |
| YES | | 120 | 69.5 | 49.9 | 36.0 | 0.721 |
| YES | | 180 | 54.2 | 40.5 | 23.6 | 0.583 |
| YES | | 240 | 52.1 | 33.1 | 18.1 | 0.547 | suggests that the distribution of Ti deposits was indeed relatively uniform, and that additional resistance over the native array was due to a feature that was uniformly present throughout the Ti carbon nanotube composite. This suggests that metal hydride decomposition may be an effective means of placing conductive deposits inside of a densely packed carbon nanotube array, although the increased electrical resistance suggests that different base metal or refinement of the processing method may be necessary to create a composite with enhanced properties.

Galinstan

Galinstan is a metal alloy, which is a liquid metal alloy at room temperature. It is an alloy of tin, gallium and indium. As a proof of principle, a solution of galinstan dispersed in acetone was prepared in an ultrasonic bath. At a pH of 6, the metal was found to ball up on the top of the carbon nanotubes. Modifying the pH of the solution, at a pH of 8.17 the carbon nanotube tips appeared to be wetted when viewed under magnification, however it was not clear if the galinstan penetrated the array.

Silver Nitrate

In modifying the surface energy of the vertically aligned carbon nanotubes (CNT) arrays to improve their liquid metal solder wettability, silver was examined because of its inherently high thermal conductivity, chemical stability, and high wetting to solder. However, amorphous carbon are usually deposited inside of the carbon nanotube arrays following the growth process to improve overall structural mechanics of the array on its aluminum substrate. However, it was found that this carbon cap interfered with Ag nucleation. As a result, a first step in $AgNO_3$ deposition was a de-capping process in boiling acetone bath for 30 minutes.

Silver was grown on the de-capped carbon nanotube arrays from the nucleation of 0.1 M silver nitrate precursor in boiling ethanol solution for 10 minutes. Following the silver nitrate deposition, the carbon nanotube arrays were calcined in argon at 450° C. for 3 hours to completely decompose the silver nitrate into elemental silver.

Deposition of Metal Coatings onto the Carbon Nanotubes of the Array following Defect Introduction by Sputter Coating Method Finally, sputter coating of the array with a metal or layers of metals to improve wetting of the array by a second metal or alloy, such as a solder was investigated. An example of a sputtered coating consisted of a Ti—Ni—Au trilayer. 60/150/250 nm of Ti/Ni/Au was sputtered on the carbon nanotube arrays treated with all the variation of approaches above. Ti was selected because it provides the potential for direct bonding (through formation of TiC) to the CNT sidewalls themselves as well as to the Ag deposits.

Infiltration of Metal Coated Carbon Nanotubes of the Array with Solder Materials Lastly, Sn—Ag—Cu solder was infiltrated into the metal coated carbon nanotubes of the array via several approaches. The prepared array (functionalization and conformal metal coating) was dip coated into a molten solder bath for infiltration. Alternately, AuSn solder was applied to the tips of the array, either in film or sheet form or deposited in thin film form via sputtering or jet vapor deposition (JVD). After application of a thin film of solder to the array, it could be reflowed to wet and infiltrate the array.

Example 2: Solder-Carbon Nanotube Composite Formed Using Metal Organic Decomposition (MOD) Ink and Thermal Performance Evaluation Thereof Preparation of Solder-Carbon Nanotube Composite To reduce the decomposition temperature of the metal precursor source, a metal organic decomposition (MOD) ink may be used. For example, silver neodecanoate may be used as a source of silver.

Silver neodecanoate was dissolved in a suitable organic solvent, xylenes, at a concentration range of 5-40% by weight. The mixture was stirred continuously to aid in dissolution.

The solution was applied to an as grown carbon nanotube (CNT) array without further functionalization using a pipette. In this example, it is believed that defect sites generated during the CNT growth process can serve as nucleation and anchoring points for the metal coating formed during decomposition.

After the silver neodecanoate solution was applied to the array, it was heated to an elevated temperature (150° C.-250° C.) in an oven. Different samples were baked at 200° C. for 30 minutes. Examination of the thickness of the arrays after metallization indicated formation of metallic silver coatings on the order of 1-50 micrometers in thickness.

Adhesion of the silver coating to the array was evaluated via sonication in a solvent (IPA/Acetone). It was observed that the areas encapsulated with silver remained adhered to the substrate even after uncoated areas of the array delaminated. After coating with silver, galinstan (an alloy of tin, gallium and indium) was infiltrated into the array by applying a droplet, and then spreading the material across the sample using a rolling motion or by spreading the material using a pipette.

Thermal Performance Evaluation

To evaluate thermal performance, preforms of the solder-carbon composites still anchored to the aluminum substrate that the carbon nanostructures were grown on were prepared. The preforms were nominally about 500 μm thick, and were infiltrated with gallium indium tin alloy. They were then cut to the size of a TO-220 resistor and the resistor was mounted to a copper heatsink using a spring clip, with the solder-carbon nanostructure composite serving as a thermal interface material (TIM).

The performance of the solder-carbon nanotube composites was compared to a 90 μm thick carbon nanotube wax composite that was known to provide excellent thermal transfer characteristics. A 500 μm thick carbon nanotube polymer composite was also compared to the solder-carbon nanotube composite in order to control for the effects of thickness.

It was observed that the 500 μm thick solder-carbon nanotube composite delivered lower thermal resistances than the much thinner 90 μm carbon nanotube wax composite. It was also observed that a secondary polymer coating (a wax) could be applied to the 500 μm solder composite and it still maintained a thermal performance that was comparable to the much thinner 90 μm thick carbon nanotube wax composite.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A solder-carbon nanostructure composite comprising:
a plurality of vertically aligned carbon nanotubes, having lengths in the range of 1-1000 microns, further comprising a metal coating thereon, and which are dispersed within and infiltrated by a solder material; and
wherein the plurality of vertically aligned carbon nanotubes is supported on or attached to a substrate;
wherein the plurality of vertically aligned carbon nanotubes have a density on the substrate surface that ranges from about $1 \times 10^7$ to $1 \times 10^{11}$ carbon nanotubes per mm²;

wherein the substrate has a melting temperature that is higher than solder material's melting temperature;
wherein the plurality of vertically aligned carbon nanotubes comprises defects thereon due to exposure to a plasma treatment, an acid bath treatment, and/or due to the growth process of the plurality of vertically aligned nanotubes; and/or
wherein the plurality of vertically aligned carbon nanotubes comprises functional groups thereon due to a polymer wrapping the plurality of carbon nanotubes.

2. The solder-carbon nanostructure composite of claim 1, wherein the functional groups of the polymer wrapping the plurality of vertically aligned carbon nanotubes comprise phosphine, phosphonates, phosphonic acids, diphosphene, sulfonates, thiols, amines, amides, carboxylic acids, carboxylates, haloalkanes, hydroxyls, ethers, esters groups, or combinations thereof.

3. The solder-carbon nanostructure composite of claim 1, wherein the polymer coating comprises or consists of a polymeric material selected from non-conjugated polymers, conjugated polymers, or aromatic polymers.

4. The solder-carbon nanostructure composite of claim 1, wherein the polymer coating comprises or is formed of a thermoplastic elastomer selected from the group consisting of a polyester-based polyurethane, styrene-ethylene-butylene-styrene, polyimide, polyamide, silicone, polysiloxane, and blends thereof.

5. The solder-carbon nanostructure composite of claim 1, wherein the metal coating comprises one or more layers of a metal, metal alloy, or metal oxide, which increase the wettability and dispersibility of the carbon nanotubes in the solder material.

6. The solder-carbon nanostructure composite of claim 1, wherein the metal coating comprises one or more layers of a metal selected from aluminum, cobalt, chromium, zinc, tantalum, platinum, gold, nickel, iron, tin, lead, silver, titanium, indium, copper, alloys thereof, metal oxides, and combinations thereof, which increase the wettability and dispersibility of the carbon nanotubes in the solder material.

7. The solder-carbon nanostructure composite of claim 1, wherein the solder material comprises a metal selected from the group consisting of aluminum, bismuth, copper, cobalt, chromium, gallium, zinc, tantalum, platinum, gold, nickel, iron, tin, lead, silver, titanium, indium, and alloys thereof.

8. The solder-carbon nanostructure composite of claim 1, wherein the solder material is selected from the group consisting of a gold-tin solder, a tin-silver-copper solder, a tin-copper solder, a tin-lead solder, a tin-chrome solder a gallium solder, a gallium-indium-tin solder, and an indium solder.

9. The solder-carbon nanostructure composite of claim 1, wherein the plurality of vertically aligned carbon nanotubes dispersed within the solder material have a controlled alignment along the in-plane direction, cross-plane direction, or along an intermediate-plane direction.

10. The solder-carbon nanostructure composite of claim 1, wherein the solder-carbon nanostructure composite has an electrical conductivity which is at least about 105% higher than that of an electrical conductivity of a pristine solder material which does not contain any dispersed carbon nanotubes therein; and/or
wherein the composite has a thermal conductivity which is at least about 20% greater than that of a thermal conductivity a pristine solder material which does not contain any dispersed carbon nanotubes therein.

11. The solder-carbon nanostructure composite of claim 1, wherein the composite has a thermal resistance of less than about 0.1 cm² K/W; and/or wherein the composite has a thermal conductivity in a range of between about 1-1000 W/m·K.

12. The solder-carbon nanostructure composite of claim 1, wherein the composite is a thermal interface material and the thermal interface material has a thermal resistance of less than about 0.1 cm² K/W.

13. A method of making a solder-carbon nanostructure composite, the method comprising the steps of:

(1) forming or providing a carbon nanostructure array comprising a plurality of vertically aligned carbon nanotubes;

wherein the plurality of vertically aligned carbon nanotubes is supported on or attached to a substrate;

wherein the plurality of vertically aligned carbon nanotubes have a density on the substrate surface that ranges from about $1 \times 10^7$ to $1 \times 10^{11}$ carbon nanotubes per mm²;

(2) optionally encapsulating the plurality of vertically aligned carbon nanotubes of the carbon nanostructure array in a suitable encapsulant, which is a polymer-based material;

(3) optionally exposing the optionally encapsulated carbon nanostructure array to a treatment that produces defect sites on the plurality of vertically aligned carbon nanotubes;

(4) optionally removing the encapsulant;

(5) depositing or forming a metal-based coating on the plurality of vertically aligned carbon nanotubes of the carbon nanostructure array of step (1);

(6) infiltrating the plurality of vertically aligned carbon nanotubes of the carbon nanostructure array of step (1) with a molten solder material;

wherein the substrate has a melting temperature that is higher than the temperature of the molten solder material and the substrate does not melt during the step of infiltrating;

(7) allowing the molten solder material to cool and solidify in order to form the solder-carbon nanostructure composite wherein the plurality of vertically aligned carbon nanotubes are dispersed within and infiltrated by the solidified solder material; and (8) optionally encapsulating the solder-carbon nanostructure composite in a polymer.

14. The method of claim 13, wherein the polymer-based material is or comprises a polymeric material selected from non-conjugated polymers, conjugated polymers, or aromatic polymers.

15. The method of claim 13, wherein the polymer-based material is a coating comprising or formed of a polyester-based polyurethane, styrene-ethylene-butylene-styrene, polyimide, polyamide, silicone, polysiloxane, and blends thereof.

16. The method of claim 13, wherein the metal coating comprises one or more layers of a metal, metal alloy, or metal oxide, which increase the wettability and dispersibility of the carbon nanotubes in the molten solder material.

17. The method of claim 13, wherein the metal-based coating comprises one or more layers of a metal selected from aluminum, cobalt, chromium, zinc, tantalum, platinum, gold, nickel, iron, tin, lead, silver, titanium, indium, copper, alloys thereof, metal oxides, and combinations thereof, which increase the wettability and dispersibility of the carbon nanotubes in the molten solder material.

18. The method of claim 13, wherein the solder material comprises a metal selected from the group consisting of aluminum, bismuth, copper, cobalt, chromium, gallium, zinc, tantalum, platinum, gold, nickel, iron, tin, lead, silver, titanium, indium, and alloys thereof.

19. The method of claim 13, wherein the solder material is a gold-tin solder, a tin-silver-copper solder, a tin-copper solder, a tin-lead solder, a tin-chrome solder a gallium solder, a gallium-indium-tin solder or an indium solder.

20. The method of claim 13, wherein the treatment of step (3) is a plasma-based treatment or an acid bath treatment.

21. The method of claim 13, wherein the metal-based coating comprises one or more coatings formed of a metal, metal alloy, and/or a metal oxide.

22. The method of claim 13, wherein the metal-based comprises one or more coatings made of aluminum, bismuth, cobalt, chromium, zinc, gallium, tantalum, platinum, gold, nickel, iron, tin, lead, silver, tungsten, titanium, indium, copper, or combinations or alloys thereof and/or one or more metal oxides, such as oxides of the metals listed.

23. The method of claim 13, wherein the metal-based coating is selected to match the solder material's composition or to match at least one or more metals present in the solder material's composition.

24. The method of claim 13, wherein the metal-based coating has a thickness in a range from about 500 to 50,000 nanometers.

25. The method of claim 13, wherein the metal-based coating is formed by atomic layer deposition, chemical vapor deposition, or sputter coating the metal-based coating.

26. The method of claim 13, wherein the metal-based coating is formed by a wet coating method.

27. The method of claim 26, wherein the carbon nanotubes are infiltrated with a liquid phase containing metal precursors which are thermally or photonically decomposed to form and deposit elemental metal on the surface of carbon nanotubes.

28. The method of claim 27, wherein the metal precursors are selected from the group consisting of metal isopropoxides, metal hydrides, galistan, and metal salts.

29. The method of claim 27, wherein the metal isopropoxides are selected from the group consisting of copper (II) isopropoxide, vanadium (V) oxytriisopropoxide, and titanium (IV) isopropoxide.

30. The method of claim 27, wherein the metal salts are selected from the group consisting of silver nitrate, silver neodecanoate, silver oxalate, silver acetate, silver tartarate, silver hexafluoroacetylacetonate cyclooctadiene, copper acetate, copper formate tetrahydrate, copper formate, copper glycolate, copper lactate, copper oleate, copper hydroxide, nickel sulfate, and nickel acetate.

31. The method of claim 27, wherein the metal precursors are decomposed by placing the infiltrated array in a furnace and heating to a temperature of at least about 200° C.; optionally under an inert atmosphere of nitrogen or argon.

32. The method of claim 13, wherein the solder material is selected from the group consisting of aluminum, bismuth, copper, cobalt, chromium, gallium, zinc, tantalum, platinum, gold, nickel, iron, tin, lead, silver, titanium, indium, and alloys thereof.

33. The method of claim 13, wherein the solder material is selected from the group consisting of a gold-tin solder, a tin-silver-copper solder, a tin-copper solder, a tin-lead solder, a tin-chrome solder a gallium solder, a gallium-indium-tin solder or an indium solder.

* * * * *